United States Patent
Cheng et al.

(10) Patent No.: US 12,462,474 B2
(45) Date of Patent: Nov. 4, 2025

(54) VIEW DEPENDENT THREE-DIMENSIONAL MORPHABLE MODELS

(71) Applicant: QUALCOMM Incorporated, San Diego, CA (US)

(72) Inventors: Ke-Li Cheng, San Diego, CA (US); Anupama S, Chennai (IN); Kuang-Man Huang, Zhubei (TW); Chieh-Ming Kuo, Taoyuan (TW); Avani Rao, Bangalore (IN); Chiranjib Choudhuri, Bangalore (IN); Michel Adib Sarkis, San Diego, CA (US); Ajit Deepak Gupte, Bangalore (IN); Ning Bi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 210 days.

(21) Appl. No.: 17/845,884

(22) Filed: Jun. 21, 2022

(65) Prior Publication Data

US 2023/0410447 A1  Dec. 21, 2023

(51) Int. Cl.
*G06T 17/00* (2006.01)
*G06T 7/50* (2017.01)
(Continued)

(52) U.S. Cl.
CPC ............ *G06T 17/00* (2013.01); *G06T 7/50* (2017.01); *G06T 7/75* (2017.01); *G06T 19/20* (2013.01);
(Continued)

(58) Field of Classification Search
CPC .......... G06T 17/20; G06T 2207/20081; G06T 2207/30201; G06T 2219/2021; G06T 7/75; G06T 13/40; G06T 15/04; G06T 2207/10016; G06T 2207/30244; G06T 7/73; G06T 17/00; G06T 19/20; G06T 2200/08; G06T 2207/20084; G06T 7/50;
(Continued)

(56) References Cited

U.S. PATENT DOCUMENTS

| 2014/0362091 A1 | 12/2014 | Bouaziz et al. |
| 2016/0042548 A1* | 2/2016 | Du .......................... G06T 13/40 345/473 |

(Continued)

OTHER PUBLICATIONS

International Search Report and Written Opinion—PCT/US2023/066184—ISA/EPO—Aug. 25, 2023.

*Primary Examiner* — Xiao M Wu
*Assistant Examiner* — Scott E Sonners
(74) *Attorney, Agent, or Firm* — Polsinelli LLP / QUALCOMM Incorporated

(57) ABSTRACT

Systems and techniques are provided for generating a three-dimensional (3D) facial model. For example, a process can include obtaining at least one input image associated with a face. In some aspects, the process can include obtaining a pose for a 3D facial model associated with the face. In some examples, the process can include generating, by a machine learning model, the 3D facial model associated with the face. In some cases, one or more parameters associated with a shape component of the 3D facial model are conditioned on the pose. In some implementations, the 3D facial model is configured to vary in shape based on the pose for the 3D facial model associated with the face.

30 Claims, 14 Drawing Sheets

(51) Int. Cl.
*G06T 7/73* (2017.01)
*G06T 19/20* (2011.01)
*G06V 40/16* (2022.01)

(52) U.S. Cl.
CPC ........ *G06V 40/171* (2022.01); *G06T 2200/08* (2013.01); *G06T 2207/20081* (2013.01); *G06T 2207/20084* (2013.01); *G06T 2207/30201* (2013.01); *G06T 2219/2021* (2013.01)

(58) Field of Classification Search
CPC ...... G06V 40/171; G06V 20/20; G06V 20/64; G06V 40/165; G06V 40/176
See application file for complete search history.

(56) References Cited

U.S. PATENT DOCUMENTS

| | | | |
|---|---|---|---|
| 2020/0125835 A1* | 4/2020 | Bouaziz | G06T 17/20 |
| 2022/0092853 A1 | 3/2022 | Booth et al. | |
| 2022/0198731 A1* | 6/2022 | Lombardi | G06T 7/97 |
| 2022/0292751 A1* | 9/2022 | Kimura | G06T 7/00 |

* cited by examiner

245

502

504

506

VIEW DEPENDENT THREE-DIMENSIONAL MORPHABLE MODELS

FIELD

The present disclosure generally relates to systems and techniques for generating three-dimensional (3D) models for faces.

BACKGROUND

Many devices and systems allow a scene to be captured by generating frames (also referred to as images) and/or video data (including multiple images or frames) of the scene. For example, a camera or a computing device including a camera (e.g., a mobile device such as a mobile telephone or smartphone including one or more cameras) can capture a sequence of frames of a scene. The frames and/or video data can be captured and processed by such devices and systems (e.g., mobile devices, IP cameras, etc.) and can be output for consumption (e.g., displayed on the device and/or other device). In some cases, the frame and/or video data can be captured by such devices and systems and output for processing and/or consumption by other devices.

A frame can be processed (e.g., using object detection, recognition, segmentation, etc.) to determine objects that are present in the frame, which can be useful for many applications. For instance, a model can be determined for representing an object in a frame and can be used to facilitate effective operation of various systems. Examples of such applications and systems include computer graphics, extended reality (e.g., augmented reality, virtual reality, and the like), image recognition (e.g., face recognition, object recognition, scene recognition, etc.), and feature estimation, among others.

SUMMARY

In some examples, systems and techniques are described herein for generating one or more models (e.g., one or more 3D facial models). According to at least one example, a method is provided for generating a 3D facial model. The method includes: obtaining at least one input image associated with a face; obtaining a pose for a 3D facial model associated with the face; and generating, by a machine learning model, the 3D facial model associated with the face. One or more parameters associated with a shape component of the 3D facial model are conditioned on the pose.

In another example, an apparatus for generating a 3D facial model is provided that includes at least one memory and at least one processor (e.g., configured in circuitry) coupled to the at least one memory. The at least one processor is configured to: obtain at least one input image associated with a face; obtain a pose for a 3D facial model associated with the face; and generate, using a machine learning model, the 3D facial model associated with the face. One or more parameters associated with a shape component of the 3D facial model are conditioned on the pose.

In another example, a non-transitory computer-readable medium is provided that has stored thereon instructions that, when executed by the at least one processor, cause the at least one process to: obtain at least one input image associated with a face; obtain a pose for a 3D facial model associated with the face; and generate, using a machine learning model, the 3D facial model associated with the face. One or more parameters associated with a shape component of the 3D facial model are conditioned on the pose.

In another example, an apparatus for generating a 3D facial model is provided. The apparatus includes: means for obtaining at least one input image associated with a face; means for obtaining a pose for a 3D facial model associated with the face; and means for generating, using a machine learning model, the 3D facial model associated with the face. One or more parameters associated with a shape component of the 3D facial model are conditioned on the pose.

In some aspects, one or more of the apparatuses described above is or is part of a vehicle (e.g., a computing device of a vehicle), a mobile device (e.g., a mobile telephone or so-called "smart phone" or other mobile device), a wearable device, an extended reality (XR) device (e.g., a virtual reality (VR) device, an augmented reality (AR) device, or a mixed reality (MR) device), a personal computer, a laptop computer, a server computer, or other device. In some aspects, an apparatus includes a camera or multiple cameras for capturing one or more images. In some aspects, the apparatus further includes a display for displaying one or more images, notifications, and/or other displayable data. In some aspects, the apparatus can include one or more sensors, which can be used for determining a location and/or pose of the apparatus, a state of the apparatuses, and/or for other purposes.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

Illustrative embodiments of the present application are described in detail below with reference to the following figures.

DETAILED DESCRIPTION

Figure 1:
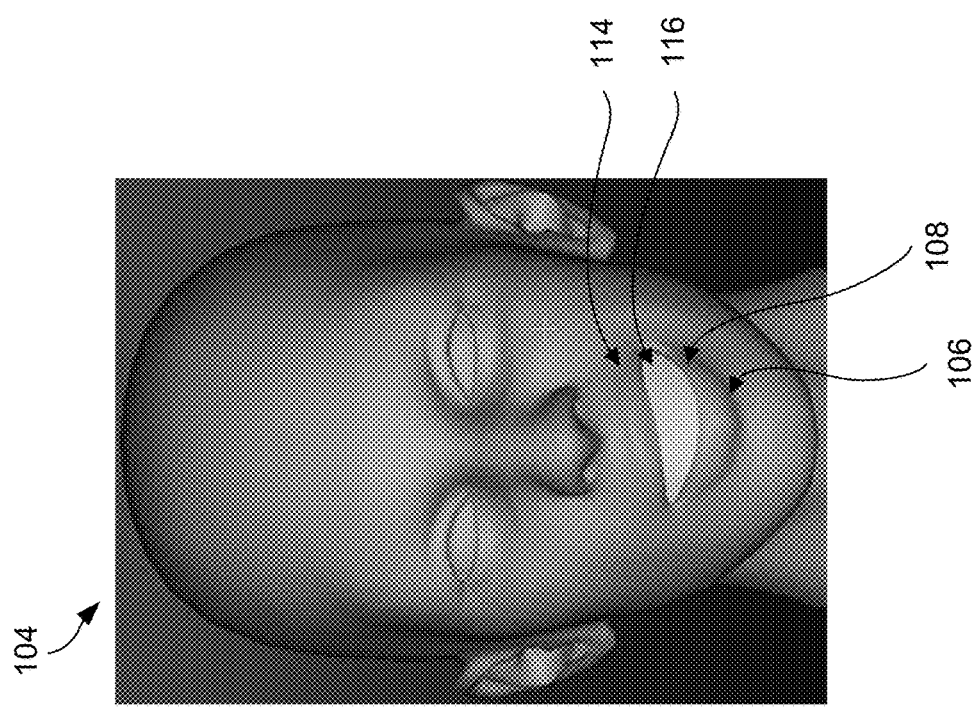
FIG. 1 illustrates an example three-dimensional (3D) facial model and corresponding two-dimensional (2D) facial images overlaid with landmarks projected from the 3D facial model, in accordance with some examples.
Figure 1:
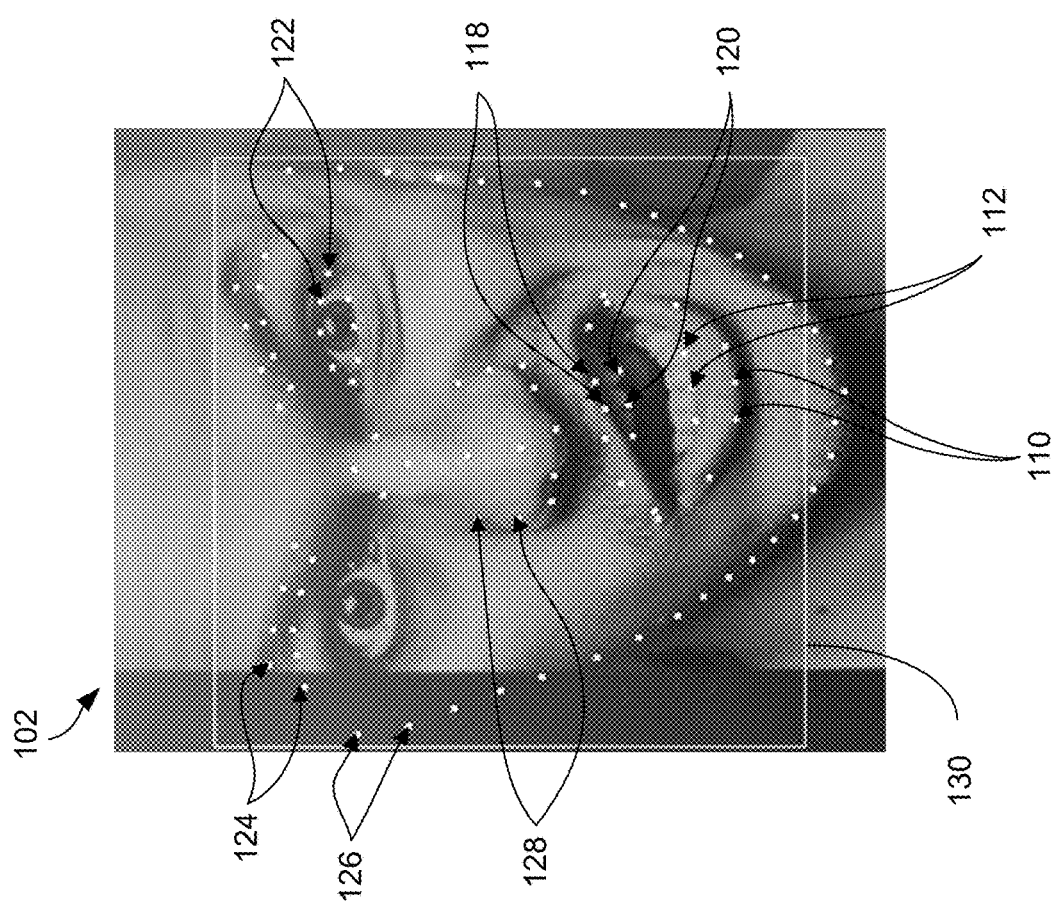

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the application as set forth in the appended claims.

The generation of three-dimensional (3D) models for physical objects can be useful for many systems and applications, such as for extended reality (XR) (e.g., including augmented reality (AR), virtual reality (VR), mixed reality (MR), etc.), robotics, automotive, aviation, 3D scene understanding, object grasping, object tracking, in addition to many other systems and applications. In AR environments, for example, a user may view images (also referred to as frames) that include an integration of artificial or virtual graphics with the user's natural surroundings. AR applications allow real images to be processed to add virtual objects to the images or to display virtual objects on a see-through display (so that the virtual objects appear to be overlaid over the real-world environment). AR applications can align or register the virtual objects to real-world objects (e.g., as observed in the images) in multiple dimensions. For instance, a real-world object that exists in reality can be represented using a model that resembles or is an exact match of the real-world object. In one example, a model of a virtual vehicle representing a real vehicle on a street may be presented by the display of an AR device (e.g., AR glasses, AR head-mounted display (HMD), or other device) while the user continues to view his or her natural surroundings through the display. The viewer may be able to manipulate the model while viewing the real-world scene. In another example, an actual object sitting on a table may be identified and rendered with a model that has a different color or different physical attributes in the AR environment. In some cases, artificial virtual objects that do not exist in reality or computer-generated copies of actual objects or structures of the user's natural surroundings can also be added to the AR environment.

There is an increasing number of applications that use face data (e.g., for XR systems, for 3D graphics, for security, among others), leading to a large demand for systems with the ability to generate detailed 3D face models in an efficient and high-quality manner. There also exists a large demand for generating 3D models of other types of objects, such as 3D models of vehicles (e.g., for autonomous driving systems), 3D models of room layouts (e.g., for XR applications, for navigation by devices, robots, etc.), among others. Generating a detailed 3D model of an object (e.g., a 3D face model) typically requires expensive equipment and multiple cameras in an environment with controlled lighting, which hinders large-scale data collection.

Performing 3D object reconstruction (e.g., to generate a 3D model of an object, such as a face model) from one or more images can be challenging. Using a face as an illustrative example of a 3D object, 3D face reconstruction can be difficult based on the need to reconstruct the face geometry (e.g., shape) and the facial expression. In some cases, when representing a 3D face model, the 3D face model may be viewed from different angles. For example, a 3D face model in an XR environment may be viewed at different angles by a user moving within the environment. In another example, the 3D facial model may move (e.g., change pose) relative to a fixed viewing position. In some cases, maintaining an accurate projection of the 3D face model onto a 2D image over a range of view angles (also referred to herein as views) can be challenging.

As illustrated in FIG. 1, white dots overlaid on a 2D facial image 102 can represent a projection of 3D vertices of a 3D facial model 104 back onto the original 2D facial image 102 used to generate the 3D facial model 104. For instance, in the illustration of FIG. 1, points corresponding to 3D vertices of major features of the 3D facial model (which can be referred to as landmarks or 2D landmarks) are depicted as white dots. As shown, landmarks 110, 112, 118, 120, 122, 124, 126, 128 are included for the outlines of lips, nose, mouth, eyes, eyebrows, nose, among others. Although the 3D facial model 104 may contain a much larger number of vertices, for purposes of illustration, only a small number of projected 3D vertices corresponding to the above listed facial features are shown. In the illustrated example of FIG. 1, landmarks corresponding to the inner contour 108 of the lower lip of the 3D facial model 104 projected onto a 2D image can include landmarks 112. Similarly, the landmarks corresponding to the outer contour 106 of the lower lip of the 3D facial model 104 can include landmarks 110.

FIG. 1 also illustrates the outer contour 114 and inner contour 116 of the upper lip of the 3D facial model 104. In some examples, landmarks corresponding to the outer contour 114 of the upper lip can include landmarks 118 and 124 and landmarks corresponding to the inner contour 116 of the upper lip can include landmarks 120. Additional landmarks projected from the 3D facial model 104 can include landmarks 122 corresponding to the left eye, landmarks 124 corresponding to the right eyebrow, landmarks 126 corresponding to the overall face outline, and landmarks 128 corresponding to the nose. As noted above, each of the landmarks 114, 116, 120, 122, 124, 126, and 128 can result from a projection of the 3D facial model 104 onto the 2D facial image 102A.

FIG. 1 illustrates a two-dimensional (2D) facial image 102 and a corresponding 3D facial model 104 generated from the 2D facial image 102 using a 3D morphable model (3DMM). In some aspects, the 3D facial model 104 can include a representation of a facial expression in the 2D facial image 102. In one illustrative example, the facial expression representation can be formed from blendshapes. Blendshapes can semantically represent movement of muscles or portions of facial features (e.g., opening/closing of the jaw, raising/lowering of an eyebrow, opening/closing eyes, etc.). In some cases, each blendshape can be represented by a blendshape coefficient paired with a corresponding blendshape vector.

In some examples, the 3D facial model 104 can include a representation of the facial shape in the 2D facial image 102. In some cases, the facial shape can be represented by a facial shape coefficient paired with a corresponding facial shape vector. In some implementations a 3D model engine (e.g., a machine learning model) can be trained (e.g., during a training process) to enforce a consistent facial shape (e.g., consistent facial shape coefficients) for a 3D facial model regardless of a pose (e.g., pitch, yaw, and roll) associated with the 3D facial model. For example, when the 3D facial model is rendered into a 2D image for display, the 3D facial model can be projected onto a 2D image using a projection technique. While a 3D model engine that enforces a consistent facial shape independent of pose, the projected 2D image may have varying degrees of accuracy based on the pose of the 3D facial model captured in the projected 2D image.

Figure 2A:
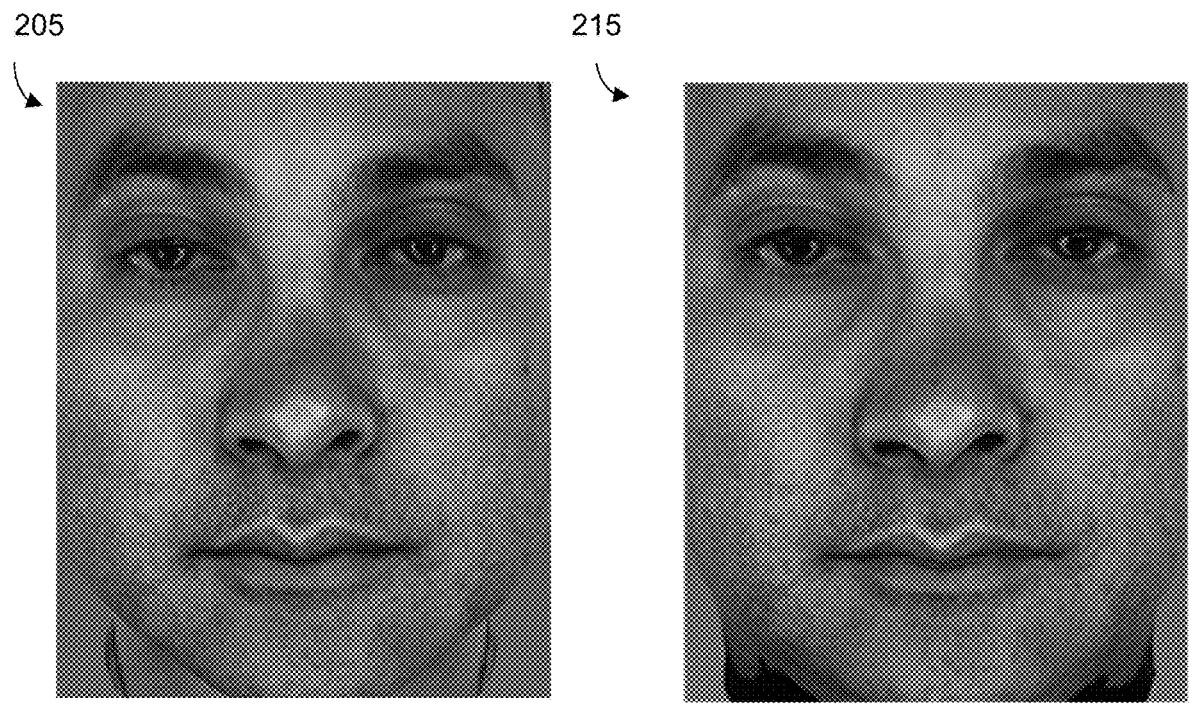
FIGS. 2A and 2B illustrate example two-dimensional (2D) images projected from 3D facial models generated by non-view dependent 3D model engines, in accordance with some examples.

As an example, FIG. 2A illustrates a projected 2D image 205 and a corresponding ground truth image 215. The ground truth image 215 can be the image used to generate the 3D facial model that in turn was projected in a neutral pose (e.g., directly facing the camera position of the projection model) to generate projected 2D image 205. As shown in FIG. 2A, the projected 2D image 205 in the neutral pose provides an accurate depiction of the face in the ground truth image 215.

Figure 2B:
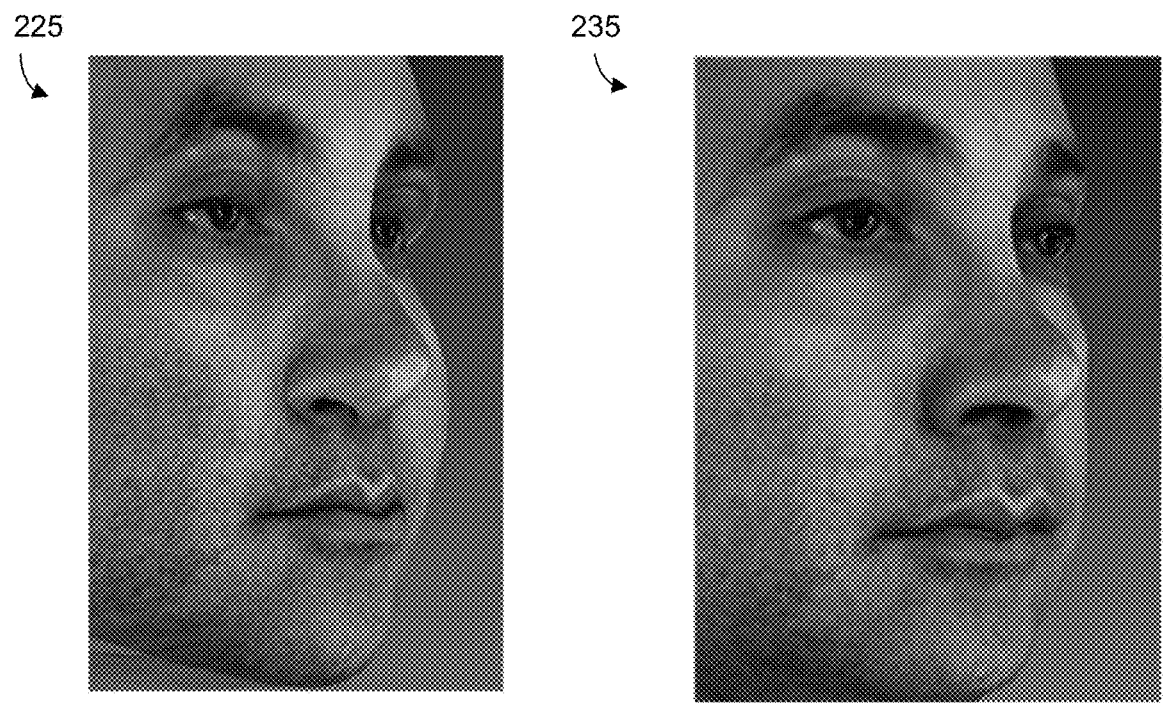

FIG. 2B illustrates a projected 2D image 225 and a ground truth image 235 of the same individual depicted in the images 205, 215 of FIG. 2A. As illustrated in the projected 2D image 225, the 3D facial model generated by 3D model engine that is trained to enforce shape consistent regardless of pose can produce distorted projected 2D images for a rotated pose (e.g., projected 2D image 225) despite produce accurate 2D images for a neutral pose (e.g., projected 2D image 205). As can be seen by comparing 2D image 225 to ground truth image 235, although a consistent facial shape for an individual may not produce accurate results regardless of the pose of the 3D facial model when a consistent facial shape (e.g., facial shape coefficients) are generated by the 3D model engine regardless of the pose of the 3D facial model.

Figure 2C:
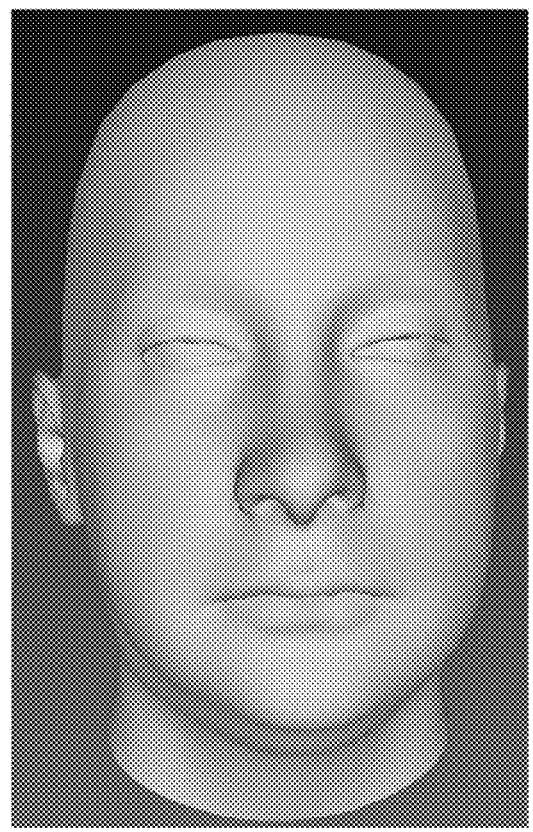
FIG. 2C illustrates a highly detailed 3D dimensional facial model, in accordance with some examples.

FIG. 2C illustrates one approach to producing accurate projected 2D images for different poses of a 3D facial model. As shown in FIG. 2C, a 3D facial model 245 can be generated with a high level of accuracy to be a true reflection of the shape of an individual's face. A highly detailed 3D facial model such as the one shown in FIG. 2C can be generated using expensive camera equipment that captures an individual's face from multiple angles. In some cases, the 3D facial model 245 can also be manually edited by skilled artists to product an accurate depiction of an individual. The process of generating such a highly detailed 3D facial model results in only a single model for the specific individual and does not provide a flexible framework for generating 3D models for any individual without advanced preparation of the detailed 3D facial model.

Accordingly, systems and techniques are needed for producing accurate 2D projected images based on a 3D facial model for a wide variety of poses of the 3D facial model that do not require highly detailed 3D facial models specifically tailored to an individual.

Systems, apparatuses, processes (or methods), and computer-readable media (collectively referred to as "systems and techniques") are described herein for generating a 3D model of a particular portion of an object from one or more images (e.g., an image having a Red (R), Green (G), Blue (B) format, referred to as an RGB image) including a sequence of images, or from frames of one or more videos (e.g., grayscale images or RGB videos). In some examples, as described in more detail below, the systems and techniques can generate a 3D model of an object (e.g., a 3D model of a face of a person) based on one or more images depicting the object. The systems and techniques can condition 3D facial model parameters (e.g., shape coefficients) based on a view (e.g., a pose) associated with the one or more images to ensure that a wide variety of poses (e.g., pitch, yaw, and roll values) can be represented by the 3D facial model and produce accurate 2D images from the 3D facial model. In some examples, the systems and techniques can utilize a trained machine learning model trained to generate a view dependent 3D facial model conditioned on a desired pose or view (e.g., pitch, yaw, and roll) of the 3D facial model.

Figure 3:
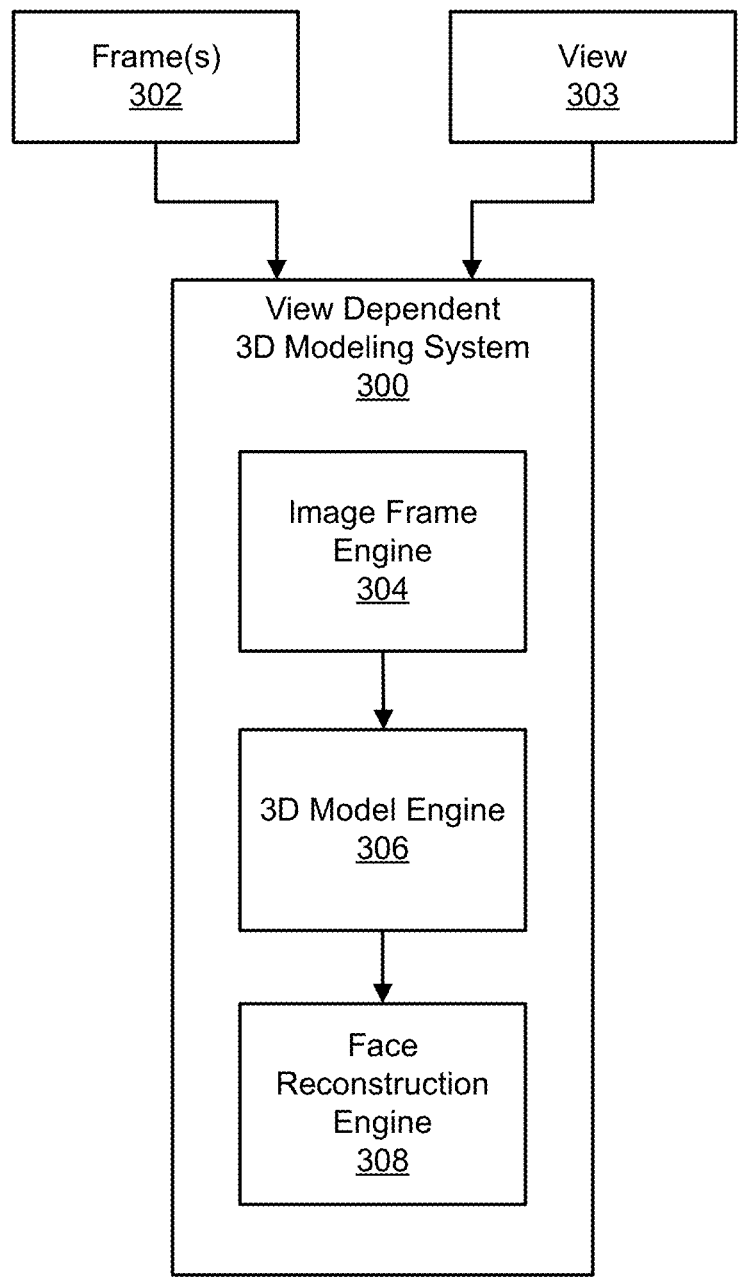
FIG. 3 is a diagram illustrating an example of a 3D modeling system, in accordance with some examples.

Various aspects of the techniques described herein will be discussed below with respect to the figures. FIG. 3 is a diagram illustrating an example of a view dependent 3D modeling system 300 that can generate a 3D model (e.g., a 3D morphable model (3DMM)) using at least one image frame 302. As shown in FIG. 3, the view dependent 3D modeling system 300 includes an image frame engine 304, a 3D model engine 306, and a face reconstruction engine 308. While the view dependent 3D modeling system 300 is shown to include certain components, one of ordinary skill will appreciate that the view dependent 3D modeling system 300 can include more or fewer components than those shown in FIG. 3. The components of the view dependent 3D modeling system 300 can include software, hardware, or one or more combinations of software and hardware. For example, in some implementations, the components of the view dependent 3D modeling system 300 can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein. The software and/or firmware can include one or more instructions stored on a computer-readable storage medium and executable by one or more processors of the electronic device implementing the view dependent 3D modeling system 300.

The image frame engine 304 can obtain or receive an image frame 302 captured by an image sensor, from storage, from memory, from an external source (e.g., a server, an external memory accessed via a network, or other external source), or the like. In some cases, the image frame can be included in a sequence of frames (e.g., a video, a sequence of standalone or still images, etc.). In one illustrative example, each frame of the sequence of frames can include a grayscale component per pixel. Other examples of frames include frames having red (R), green (G), and blue (B) components per pixel (referred to as an RGB video including RGB frames), luma, chroma-blue, chroma-red (YUV, YCbCr, or Y'CbCr) components per pixel and/or any other suitable type of image. The sequence of frames can be captured by one or more cameras, obtained from storage, received from another device (e.g., a camera or device including a camera), or obtained from another source. In some implementations, the image frame engine 304 can convert the image frame 302 to grayscale. The image frame engine 304 can, in some cases, crop a portion of the image frame 302 that corresponds to a face. In some examples, the image frame engine 304 can perform a face detection process and/or face recognition process to detect and/or recognize a face within the image frame 302. The image frame engine 304 can generate or apply a bounding box (e.g., bounding box 130 shown in FIG. 1) around the face and can crop out the image data within the bounding box to generate an input image for the 3D model engine 306.

The 3D model engine 306 can receive an input image (e.g., the image frame 302, the cropped bounding box around the face in the image frame 302, etc.) from the image frame engine 304. The 3D model engine 306 can also receive a view 303 provided as an input to the view dependent 3D modeling system 300. Using the image frame 302 and the view 303, the 3D model engine 306 can perform a 3D model fitting technique to generate a 3D model (e.g., a 3DMM model) of the face (e.g., the face of the person in the image frame 302). The 3D model fitting technique can include solving for shape coefficients $a_i$ and expression coefficients by that can be used to generate a 3DMM representing the face in the input image.

In some examples, the 3D model fitting performed by 3D model engine 306 can include the view 303, which can contain positional information related to the object. In the example of the object being a head of a person, the view 303 may include pose information related to a pose of the head. For example, the pose information may indicate an angular rotation of the head with respect to a neutral position of the head. The rotation may be along a first axis (e.g., a yaw axis), a second axis (e.g., a pitch axis), and/or a third axis (e.g., a roll axis). The 3D model generated by the 3D model engine 306 can have differing shape and/or feature coefficients based on the specific view 303 input into the view dependent 3D modeling system.

In some cases, the 3D model fitting can also include a focal length for projection of the 3D model onto a 2D image using any suitable projection technique. In some examples, a weak perspective model can use the focal length produced by the 3D model engine 306 to project the 3D vertices of the 3D model (e.g., the 3DMM) onto a 2D image. In some examples, a full perspective model can use the focal length produced by the 3D model engine 306 to project the 3D vertices of the 3D model (e.g., the 3DMM) onto a 2D image.

In another illustrative example, a full perspective model can be used to project the 3D model onto an image plane. For example, a full perspective projection can be provided by replacing the average depth $Z_{ave}$ in Equation 3 with the actual depth Z for each 3D vertex of the posed 3D model $S_p$. The weak perspective model and full perspective model techniques for projecting a 3D model onto an image plane, and any suitable projection technique can be used without departing from the scope of the present disclosure.

The face reconstruction engine 308 can receive the coefficients (and any other output parameters such as pose, focal length, etc.) generated by the 3D model engine 306 to generate the 3D model (e.g., the 3DMM). The 3D model can be generated or constructed as a linear combination of a mean face (sometimes referred to as a neutral face), facial shape basis vectors, and facial expression basis vectors. The mean face can represent an average face that can be transformed (e.g., by the shape basis vectors and expression basis vectors) to achieve the desired final 3D face shape of the 3D model. The facial shape basis vectors can be used to scale proportions of the mean face. In some cases, the facial shape basis vectors may be used to represent a fat or thin face, a small or large nose, and any adjustment to the basic facial shape. In some implementations, the facial shape basis vectors are determined based on principal component analysis (PCA). In some cases, the facial expression basis vectors can represent facial expressions, such as smiling, lifting an eyebrow, blinking, winking, frowning, etc.

A 3D model S generated by the 3D model engine 306 using a 3D model fitting technique (e.g., a 3DMM generated using a 3DMM fitting technique) can be a statistical model representing 3D geometry of an object (e.g., a face). For instance, a 3D model (e.g., a 3DMM) can be represented by a linear combination of a mean face $S_0$ with basis terms (also referred to as basis vectors) for facial shape $U_i$ and facial expressions $V_j$ with coefficients for facial shape $a_i$ and facial expressions $b_j$, for example, as follows:

$$S=S_0+\Sigma_{i=1}^{M}a_i \cdot U_i+\Sigma_{j=1}^{N}b_j \cdot V_j \quad (1)$$

In the example of Equation (1), there are M facial shape coefficients $a_i$ and M facial shape basis vectors $U_i$ where M is an integer greater than or equal to 1. In some implementations, each of the mean face $S_0$, facial shape basis vectors $U_i$, and facial expression vectors $V_j$ can include position information for 3D vertices (e.g., x, y, and z coordinates) that can be combined to form the 3D model S. In some implementations, facial shape basis vectors $U_i$, and facial expression vectors $V_j$ can be expressed as positional offsets from the mean face $S_0$, where the coefficients for facial shape $a_i$ and facial expressions $b_j$ provide a scaling factor for corresponding offset vectors.

One illustrative example of facial expression basis vectors are blendshapes. As used herein, a blendshape can correspond to an approximate semantic parametrization of all or a portion of a facial expression. For example, a blendshape can correspond to a complete facial expression, or correspond to a "partial" (e.g., "delta") facial expression. Examples of partial expressions include raising one eyebrow, closing one eye, moving one side of the face, etc. In one example, an individual blendshape can approximate a linearized effect of the movement of an individual facial muscle. In some cases, the semantic representation can be modeled to correspond with movements of one or more facial muscles.

In one illustrative example, the 3D model S includes three thousand 3D vertices. In one illustrative example, M is equal to 319, which corresponds to 319 facial shape basis vectors $U_i$ and facial shape coefficients $a_i$. In some implementations, the shape basis vectors $U_i$ can include principal component analysis eigenvectors. In some cases, there are N facial expression coefficients $b_j$ and N facial expression basis vectors where N is an integer greater than or equal to 1. In some cases, the facial expression vectors $V_j$ can include blendshape vectors. In one illustrative example, N is equal to 39, which corresponds to 39 facial expression basis vectors $V_j$ and 39 facial expression coefficients $b_j$ (e.g., 39 blendshapes and 39 blendshape coefficients). In some cases, the result of the linear combination shown in Equation (1)

can be a 3D model (e.g., a 3DMM) of a face in a neutral pose. In some examples, the 3D model can be rotated with pose information such as yaw, pitch, and roll values to match the pose of the face in the image frame 302.

Face reconstruction engine 308 can receive the pose information from the 3D model engine 306 to generate a 3D model (e.g., a 3DMM) and a projection of the 3D model into a 2D image space. The 3D model S (a facial model) can be generated according to Equation (1) above. As noted above, the 3D model S results in a facial model with a neutral pose. In some cases, the 3D model S can be rotated to create a posed 3D model $S_p$ according to Equation (2) below:

$$S_p = R(\alpha,\beta,\gamma)S \qquad (2)$$

where R ($\alpha$, $\beta$, $\gamma$) is a 3×3 rotation matrix with $\alpha$, $\beta$, $\gamma$ rotation angles.

In some cases, the 3D model can be projected onto an image plane using any suitable projection technique. In one illustrative example, a weak perspective projection can be used to project the 3D model onto an image plane. Equation (3) below provides an example of how a weak perspective projection technique can be used to project X and Y components $$\begin{bmatrix} X \\ Y \end{bmatrix}$$

of each 3D vertex coordinate of the posed 3D model $S_p$ onto x and y coordinates of a 2D image $$\begin{bmatrix} x \\ y \end{bmatrix}$$

according to Equation (3) below:

$$\begin{bmatrix} x \\ y \end{bmatrix} = \frac{f}{Z_{ave}} \begin{bmatrix} X + t_x \\ Y + t_y \end{bmatrix} \qquad (3)$$

where f is the predicted focal length output by the 3D model engine 306, $Z_{ave}$ is the average depth (or distance) of the face from a weak perspective camera. The projection of Equation (3) can be performed for each 3D vertex of the posed 3D model $S_p$.

In some cases, the 3D model engine 306 can include a machine learning model (e.g., a deep neural network, such as a convolutional neural network (CNN), general adversarial network, inception network, etc.). The 3D model engine 306 can receive an image frame 302 and an input view 303 as inputs. In some cases, the image frame 302 and the view 303 can be one of a plurality of images and corresponding views in a training dataset. The training dataset can include a large number of images that includes a variety of facial shapes, expressions, and views (e.g., including one or multiple views for each of the faces depicted in the images) in order to train the 3D model engine 306 to generate 3D facial models (e.g., 3DMMs) for a large variety of faces and views. In one illustrative example, a training dataset can include one million images and views, two million images and views, or any other suitably large number of images and views. In some cases, the 3D model engine 306 can be trained with the same training data set through multiple iterations, also known as epochs. In some cases, the training dataset used to train the 3D model engine 306 can include images, views, and labels (e.g., in a supervised training process) indicating the known features in the frames. In some cases, the training dataset can include annotated ground truth 2D landmark information corresponding to the locations of facial features for each image frame 302. In some cases, the 2D landmark information can be calculated from each image frame 302 using a landmark algorithm.

During training, the 3D model engine 306 can utilize one or more loss functions to analyze error in the 3D model parameters (e.g., coefficients of Equation (1)). A loss function L can be used to determine the amount of error in a 3D model produced by the 3D model engine 306 relative to the ground truth data provided as input to the 3D model engine 306. One example loss function includes a mean squared error (MSE). The MSE is defined as $$E_{total} = \sum \frac{1}{2}(\text{target} - \text{output})^2,$$

which calculates the sum of one-half times the actual answer (e.g., the ground truth landmark location) minus the predicted (output) answer squared. Another example loss function includes a normalized mean error, where the error between the ground truth landmarks and the landmarks predicted by the 3D model engine 306 can be normalized by the eye distance of the predicted face.

An example of loss function $L_{non-VD}$ for a non view dependent (non-VD) 3D model engine (e.g., as used to generate 2D projected images 205, 225 of FIG. 2A and FIG. 2B, not shown here) is shown in Equation (4) below. As shown in Equation (4), the loss function used to train 3D model engine 306 can include multiple components:

$$L_{non-VD} = L_{Landmarks} + L_{ShapeConsistency} + L_{other} \qquad (4)$$

Where $L_{Landmarks}$ can be used to represent 2D and/or 3D landmark error of the 3D model generated by the non-VD 3D model engine, $L_{ShapeConsistency}$ can be used to maintain consistency in shape coefficients $a_i$, and other loss $L_{other}$ can include any other loss functions that may be applied during the training process. In some cases, $L_{other}$ can include a clamp loss that can limit the amount of change in facial expression coefficients $b_j$ during the training process and/or be used to adaptively adjust the upper and/or lower bound values allowable for the facial expression coefficients. In some implementations, $L_{other}$ can include a regularization loss that can be used to present the facial shape coefficients $a_i$ and/or facial expression coefficients $b_j$ from becoming too large during training.

Unlike the non-VD 3D model loss function shown in Equation (4), a VD 3D model loss function $L_{VD}$ of the 3D model engine 306 can omit the shape consistency loss $L_{ShapeConsistency}$ as shown in Equation (5) below:

$$L_{VD} = L_{Landmarks} + L_{other} \qquad (5)$$

As shown in Equation (5) the landmark loss $L_{Landmarks}$ and other loss $L_{other}$ can be used by the VD 3D model loss function of the 3D model engine 306. The landmark loss $L_{Landmarks}$ can include 2D and/or 3D landmark loss functions. An example 2D loss function is shown in Equation (6) below:

$$L_{2D} = \frac{1}{M} \sum_i \|Proj_v(p_i) - Proj_v(\hat{p}_i)\|_2^2 \qquad (6)$$

Where $\text{Proj}_v(p_i)-\text{Proj}_v(\hat{p}_i)$ is the difference between the projected 2D landmark location from the ground truth 3D model and the projected 2D landmark location of a corresponding vertex generated by the 3D model engine 306 and M (an integer) is the number of 2D landmarks.

An example 3D loss function is shown in Equation (7) below:

$$L_{3D} = \frac{1}{N}\Sigma_i \|p_i - \hat{p}_i\|_2^2 \qquad (7)$$

Where $p_i-\hat{p}_i$ is the difference between the 3D vertex location from the ground truth 3D model and the 3D vertex location of a corresponding vertex generated by the 3D model engine 306 and N (an integer) is the number of 3D vertices.

$L_{Landmarks}$ can be a weighted sum of different 2D and/or 3D landmark Loss components as shown in Equation (8) below:

$$L_{Landmarks} = \lambda_{3D}L_{3D} + \lambda_{2D}L_{2D} \qquad (8)$$

Where $\lambda_{3D}$ and $\lambda_{2D}$ are weighting coefficients for the 3D landmark loss and 2D landmark loss, respectively.

An example regularization loss function is shown in Equation (9) and an example clamp loss function is shown in Equation (10) below:

$$L_{reg} = \Sigma_i \alpha_i^2 + 0.1 > \Sigma_j |b_j| \qquad (9)$$

Where $\alpha_i$ are shape coefficients and $b_j$ are facial expression coefficients $$L_{clamp} = \Sigma_j f_{UB}|b_j - \overline{b}_{UB,j}| + f_{LB}|\overline{b}_{LB,j} - b_j| \qquad (10)$$

Where $\overline{b}_{UB,j}$ and $\overline{b}_{LB,j}$ are upper and lower bound values, respectively, for each of the facial expression coefficients $b_j$ generated by the 3D model engine 306.

During inference, (e.g., after training is complete), the 3D model engine 306 can output a 3D facial model (e.g., a 3DMM) based on an input image frame 302 and view 304. Because the constraint on shape coefficients $\alpha_i$ (e.g., shape consistently loss $L_{ShapeConsistency}$ of Equation (4)) is omitted from the loss function shown in Equation (5), the resulting output 3D facial model for an individual can have different shape coefficients depending on the view input (e.g., the pose) of the generated 3D facial model. However, removing the constraint on shape consistency can result in a 3D facial model that can produce 2D projected images from different poses.

Figure 4:
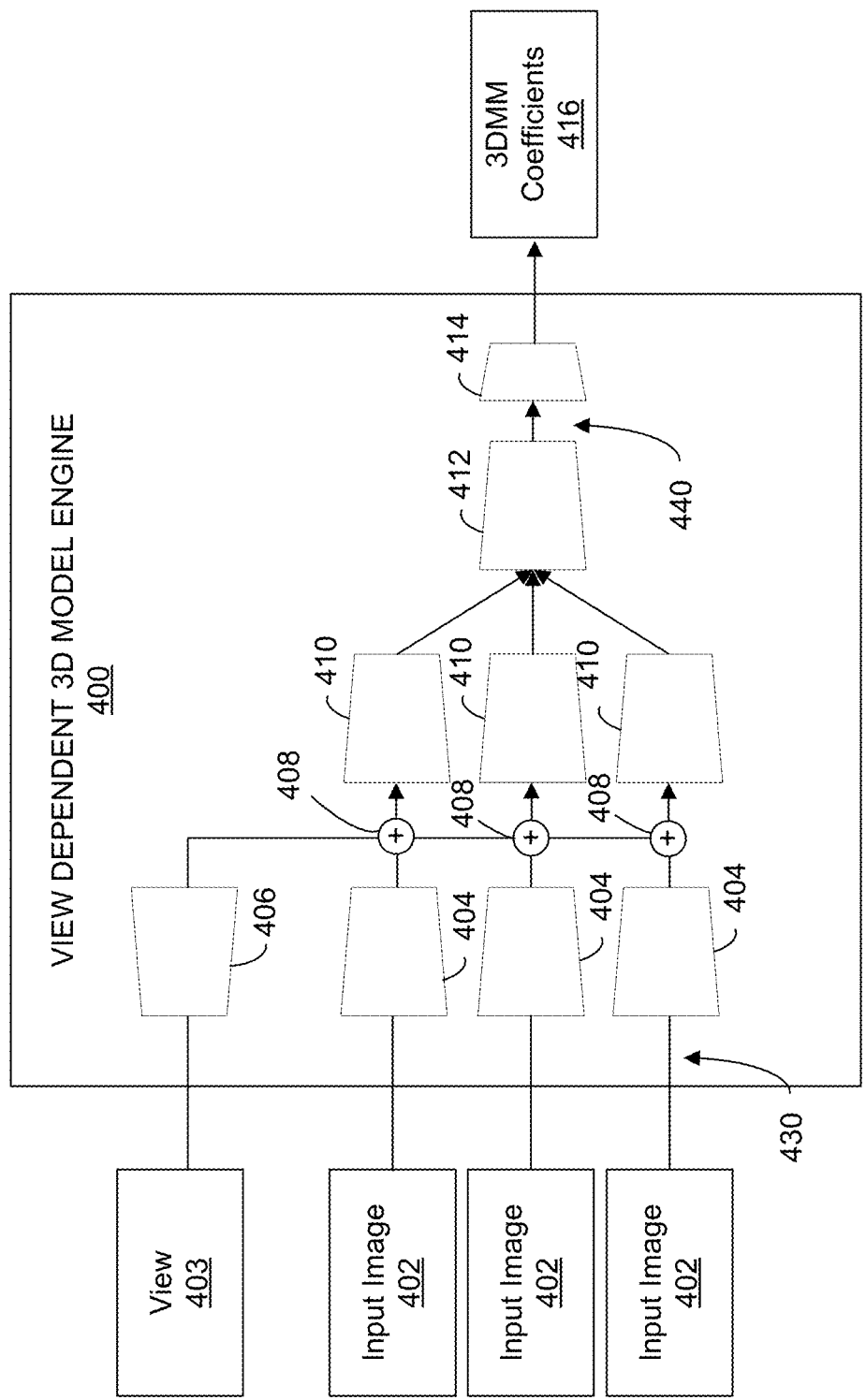
FIG. 4 is a diagram illustrating an example view dependent 3D model engine, in accordance with some examples.

FIG. 4 illustrates a block diagram of an example view dependent 3D model engine 400. In some cases, the view dependent 3D model engine can correspond to the 3D model engine 306 of FIG. 3. The view dependent 3D model engine 400 of FIG. 4. Includes inception modules 404, fully connected layer 406, summation blocks 408, second stage inception modules 410, third stage inception module 412, and fully connected layer 414. In the illustrated example of FIG. 4, the view dependent 3D model engine 400 receives three input images 402 and a view 403 as input.

Figure 5:
FIG. 5 illustrates example partial images that can be inputs to a view dependent 3D modeling engine, in accordance with some examples
Figure 5:
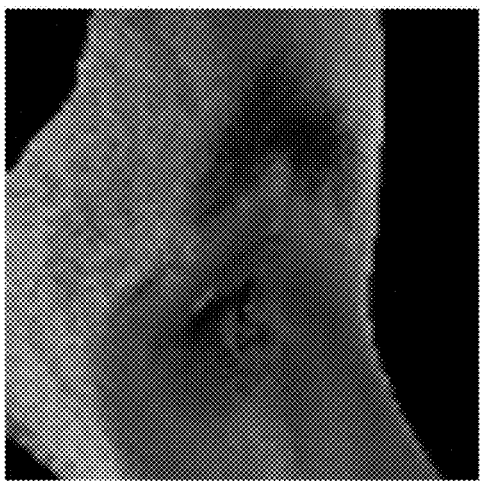
Figure 5:
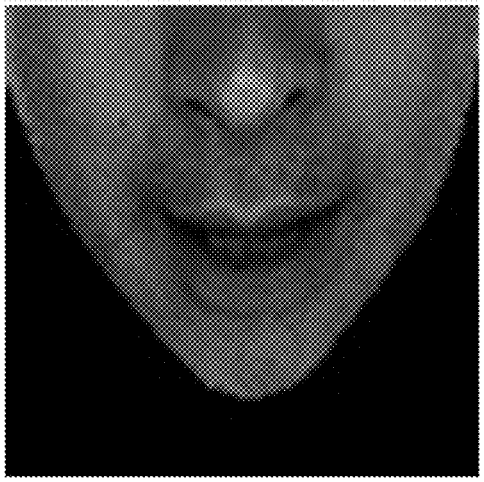

FIG. 5 provides one illustrative example of partial facial images 502, 504, and 506 that can correspond to the three input images 402. In some implementations, the partial facial images 502, 504, 506 can be obtained from head mounted cameras. In some examples, the head mounted cameras can capture side views of the left eye (e.g., facial image 502) and the right eye (e.g., facial image 504) and an oblique view of the mouth nose, and jaw of an individual. In some cases, the head mounted cameras can be included in a head mounted device. In one illustrative example, the head mounted device can include an XR system. In some cases, it may be desired to create a 3D facial model of the individual captured in the partial facial images 502, 504, 506. In some cases, the 3D facial model of the individual may be used to generate 2D images of the individual that provide an accurate representation of the user as the pose of the individual's head changes.

Returning to FIG. 4, each of the input images 402 can be input to a corresponding inception module 404. The inception modules 404 can be used to generate features based on the input images 402. In some implementations, inception modules 404 can include multiple convolutional neural networks with different kernel sizes (e.g., 1×1, 3×3, and 5×5 pixel kernels) that can be applied to the input images in parallel and combined into a single feature vector output from the inception modules 404 for each corresponding input image 402. In some aspects, the inception modules 404 can detect features of different scales using the different convolutional kernels run in parallel and combine the convolutional network outputs in a feature vector. In one illustrative example, the outputs from the individual convolutional networks within the inception modules 404 can be concatenated into a feature vector and passed to the next stage of the view dependent 3D model engine 400. The outputs of each inception module that receives an input image 402 as an input is referred to as an input image feature vector herein.

As shown in FIG. 4, the view 403 can be input into a fully connected layer 406. In some implementations, the fully connected layer 406 can output a feature vector (referred to as the view feature vector herein) based on the view 403. In the illustrated example configuration of FIG. 4, the view feature vector can separately be combined with each of the feature vectors output from the inception modules 404 at summation blocks 408. In one illustrative example, the summation blocks 408 can perform element-wise addition of the view feature vector and each individual input image feature vector from the inception modules 404. The output of each summation block 408 can be passed to second stage inception modules 410. The outputs of each of the second stage inception modules 410 can all be passed to a third stage inception module 412. Accordingly, the input to the third stage inception module can represent features generated based on all three of the input images 402 as well as the view 403. In the illustrated example, a fully connected layer 414 receives the output of the third stage inception module 412 and outputs 3D facial model coefficients 416 (e.g., 3DMM coefficients of Equation (1)).

During training, the view dependent 3D model engine of FIG. 4 can use a training process similar to the process described for training the 3D model engine 306 of FIG. 3. The loss function can include landmark loss and other losses (e.g., regularization loss and/or clamp loss) as described with respect to Equation (5) above. In one illustrative example, the landmark loss component used to train view dependent 3D module engine can include a landmark loss $L_{Landmarks,hmc}$ as shown in Equation (11) below $$L_{Landmarks,hmc} = \lambda_{3D}L_{3D} + \lambda_{2D}L_{2D} + l_{2D,hmc}L_{2D,hmc} \qquad (11)$$

The loss functions of the first two terms $L_{f2D}$ and $L_{3D}$ of equation (11) can correspond to Equations (5) and (6) above, respectively. The additional loss term $L_{2D,hmc}$ can represent an error between the input images 402 and a projection of corresponding vertices of the 3D model generated by the view dependent 3D model engine 400 onto to the landmarks of the input images. As a result, the loss function used to train the view dependent 3D model engine 400 can utilize three different sources of landmarks to achieve high landmark accuracy despite allowing for changes in the shape coefficients of the 3D facial model coefficients 416.

Equation (12) below provides an example additional loss function $L_{2D,hmc}$:

$$L_{2D,hmc} = 0.33 L_{2D,LEye} + 0.33 L_{2D,REye} + 0.33 L_{2D,Mouth} \quad (12)$$

Where $L_{2D,LEye}$, $L_{2D,REye}$, $L_{2D,Mouth}$ are 2D landmark loss functions corresponding to the input images 402 corresponding to the left eye (e.g., partial facial image 502 of FIG. 5), right eye (e.g., partial facial image 504 of FIG. 5), and mouth (e.g., partial facial image 506 of FIG. 5). In some cases, the 2D landmark loss functions $L_{2D,LEye}$, $L_{2D,REye}$, $L_{2D,Mouth}$ can have the form of Equation (6). Accordingly, the loss functions can represent the error between projected 2D landmarks from corresponding 3D vertices of the facial model and 2D landmarks of the ground truth input images 402.

Returning to FIG. 3, in some implementations, the face reconstruction engine 308 can generate a UV face position map (also referred to as a UV position map) for an input image frame 302 that includes a face. In some cases, the UV face position map can provide and/or represent a 2D map of the face in the input image. For instance, the UV face position map can be a 2D image that records and/or maps the 3D positions of points (e.g., pixels) in UV space (e.g., 2D texture coordinate system). The U in the UV space and the V in the UV space can denote the axes of the UV face position map (e.g., the axes of a 2D texture of the face). In one illustrative example, the U in the UV space can denote a first axis (e.g., a horizontal X-axis) of the UV face position map and the V in the UV space can denote a second axis (e.g., a vertical Y-axis) of the UV face position map. In some examples, the UV position map can record, model, identify, represent, and/or calculate a 3D shape, structure, contour, depth and/or other details of the face (and/or a face region of the head). In some cases, the UV face position map can be applied as a texture to the 3DMM generated by the 3D model engine 306. In some examples, the 3DMM with the texture provided from the UV face position map can be used to render a 3D digital representation of the input image. In some implementations, a machine learning model (e.g., a neural network) can be used to generate the UV face position maps.

The 3D modeling system 300 illustrated in FIG. 3 illustrates a functional block diagram that can be implemented in hardware, software, or any combination of the hardware and software. As an example, the functional blocks illustrated can use the illustrated relationships to identify functional blocks that can be converted into a universal modeling language (UML) diagram to identify an example implementation of the view dependent 3D modeling system 300 at least partially as an object oriented arrangement in software. However, the 3D modeling system 300 can be implemented without abstractions and, for example, as static functional implementations. In some examples, the view dependent 3D modeling system 300 can be implemented in whole or in part by a computing device or system with the architecture of computing system 1300 shown in FIG. 13.

Although specific examples of loss functions are described herein in association with the 3D model engine 306 (e.g., 2D landmark loss, 3D landmark loss, clamp loss, and regularization loss), it should be understood that any suitable loss function can be used to analyze error in the output of the 3D model engine 306 without departing from the scope of the present disclosure.

Referring to FIG. 4, view information was included in the layers of the 3D modeling system at the summation blocks 408 between the inception modules 404 and the second stage inception modules 410). As used herein, the point at which the view information is included within the layers of a 3D modeling system is referred to as the injection location. Although one example injection location for the view feature vector is illustrated in FIG. 4, other injection locations can be used without departing from the scope of the present disclosure.

Figure 6A:
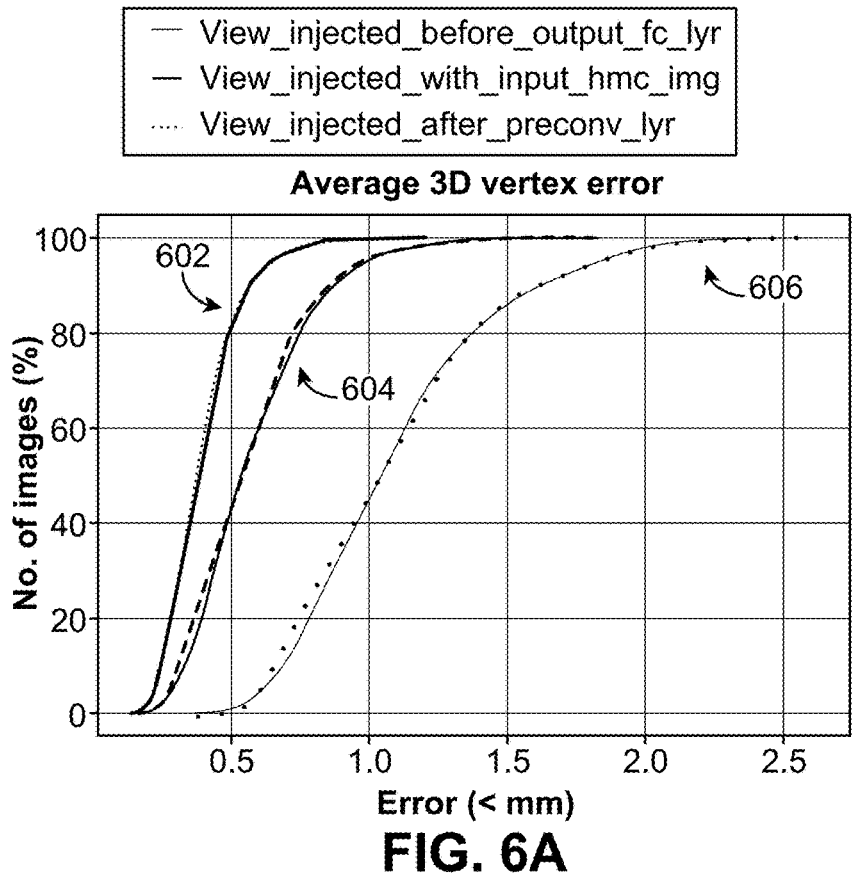
FIG. 6A and FIG. 6B are plots illustrating cumulative distribution functions (CDFs) of 3D vertex error for different locations of injecting view information in the example view dependent 3D model engine of FIG. 4, in accordance with some examples.
Figure 6B:
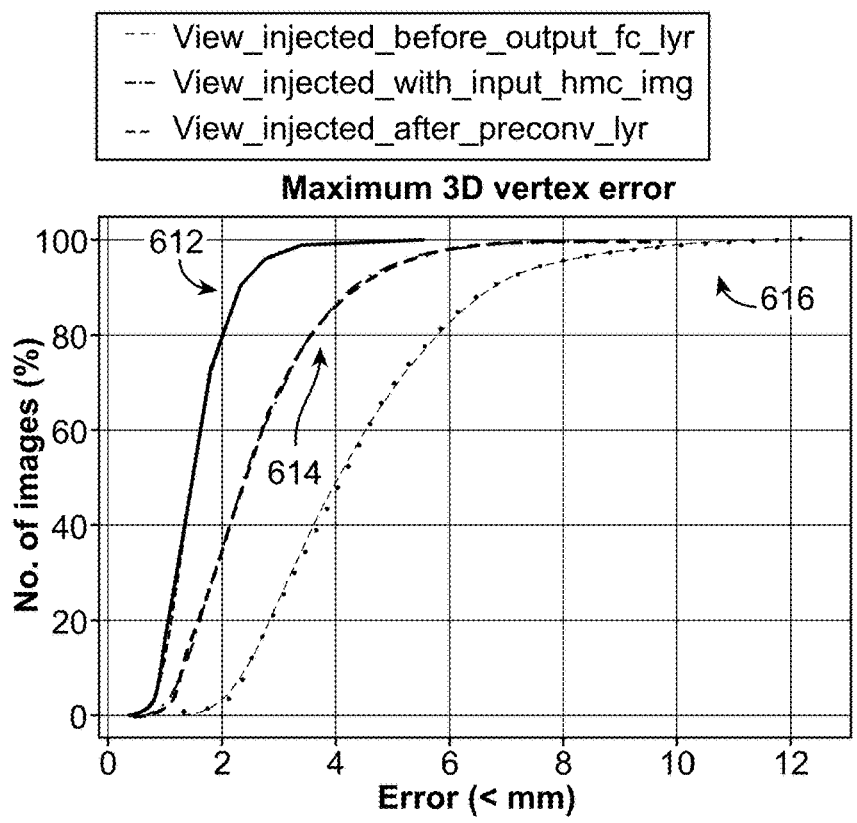

FIG. 6A and FIG. 6B illustrate experimental cumulative distribution function (CDF) plots 602, 604, 606 of average 3D vertex error and plots 612, 614, 616 of maximum 3D vertex error for 3D facial models generated using view dependent 3D model engines according to the present disclosure. For each of the plots in FIGS. 6A and 6B, the horizontal axis represents a 3D vertex error between the generated 3D facial model and the ground truth facial model and the vertical axis indicates the percentage of images that had an error less than the horizontal axis value. The injection location shown in the example view dependent 3D model engine 400 of FIG. 4 corresponds to the plots 602, 612.

Another example injection location for the view information could be to combine the view information with each of the input images 402 of FIG. 4 before the inception modules 404 as indicated by arrow 430 in FIG. 4. Experimental 3D vertex position errors for a 3D module engine similar to the 3D model engine 400 but modified with an injection location before inception modules is indicated by plots 604, 614.

Another example injection location for the view information could be between the third stage inception module 412 and the fully connected layer 414 as indicated by arrow 440 in FIG. 4. Experimental 3D vertex position errors for a 3D model engine similar to the 3D model engine 400 but modified with an injection location before the fully connected layer 414 is indicated by plots 606, 616.

Figure 7:
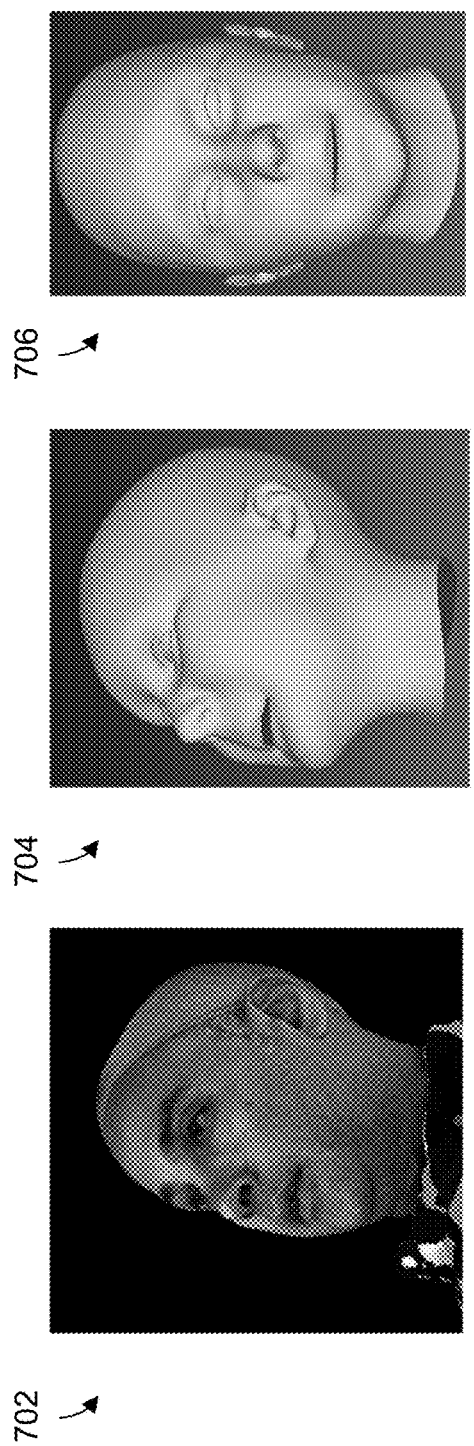
FIG. 7 and FIG. 8 illustrate example facial models generated by a view dependent 3D model engine, in accordance with some examples.
Figure 8:
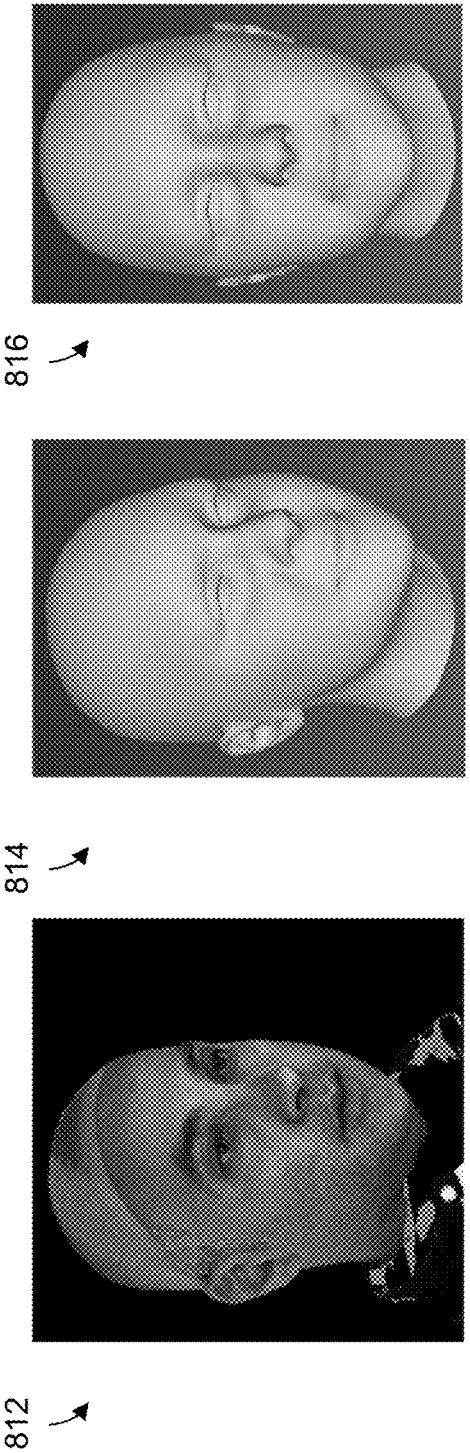

FIG. 7 and FIG. 8 illustrate example 3D facial models generated with a view dependent 3D model engine (e.g., view dependent 3D model engine 400 of FIG. 4) based on images of an individual captured with different views (e.g., poses) of the individual's head.

As shown in FIG. 7, the ground truth 2D image 702 of the individual depicts a pose facing toward the upper left corner of the 2D image 702. The resulting 3D facial model (e.g., 3DMM) generated by the view dependent 3D model engine is shown in image 704 in the same pose as the ground truth 2D image 702. The same 3D facial model from image 704 is shown with a neutral pose (e.g., facing directly at the camera) in image 706.

As shown in FIG. 8, the ground truth 2D image 812 of the individual depicts a pose facing toward the lower right corner of the 2D image 812. The resulting 3D facial model (e.g., 3DMM) generated by the view dependent 3D model engine is shown in image 814 in the same pose as the ground truth 2D image 702. The same 3D facial model from image 814 is shown with a neutral pose (e.g., facing directly at the camera) in image 816.

Comparing the neutral pose images 706, 816 for the same individual illustrates the result of the relaxation of the shape consistency constraint from a non view dependent 3D model engine as shown in Equation (4). Although the underlying 3D mesh of the two 3D facial models generated for each pose has a different shape, projected 2D images resulting from the differently-shaped 3D facial models at the different poses can show improved accuracy (e.g., compared to 2D image 225 shown in FIG. 2B).

Figure 9A:
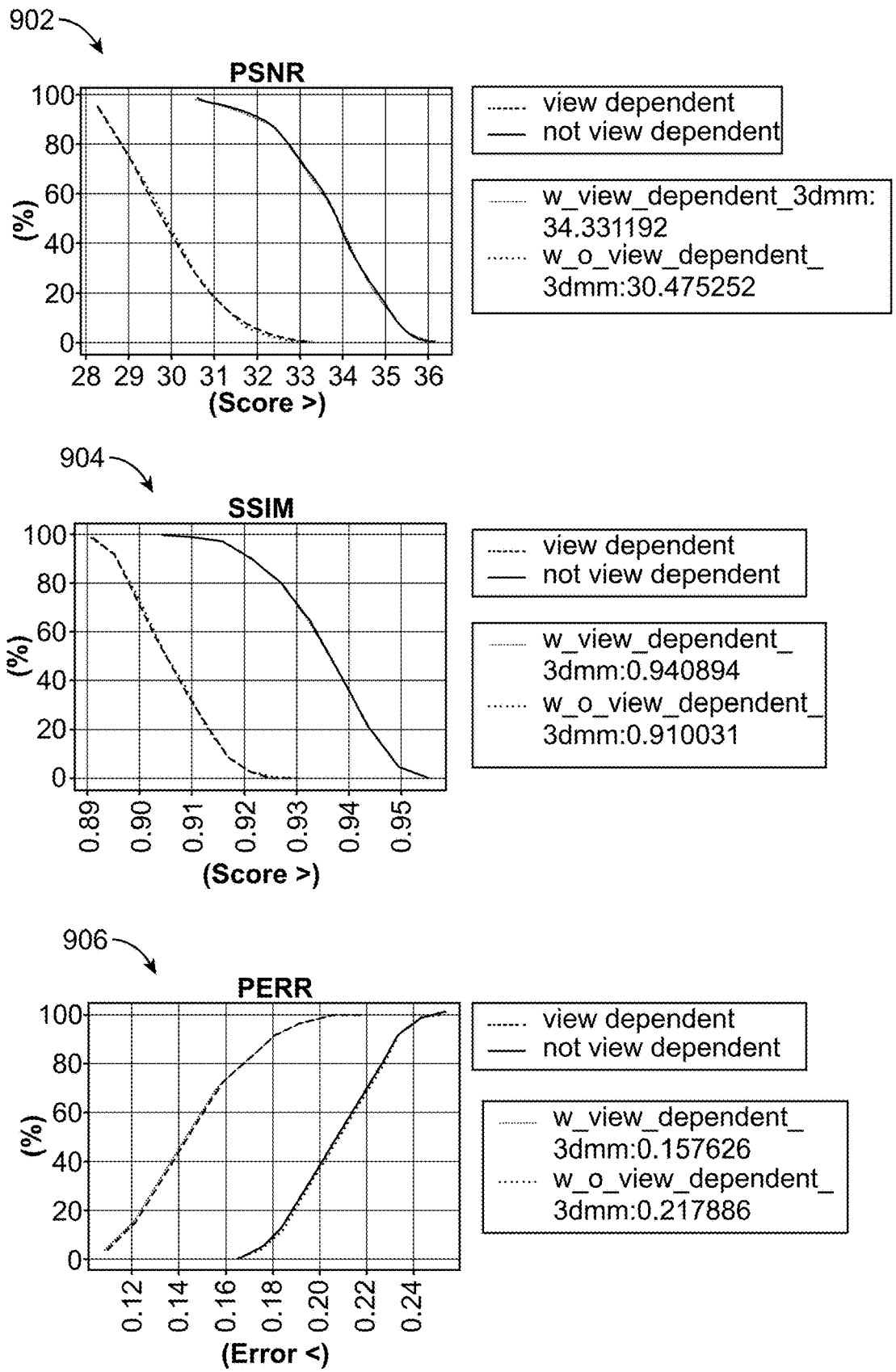
FIG. 9A and FIG. 9B illustrated example performance metrics comparing 3D facial models generated by a view dependent 3D model engine and a non view dependent 3D model engine, in accordance with some examples.
Figure 9B:
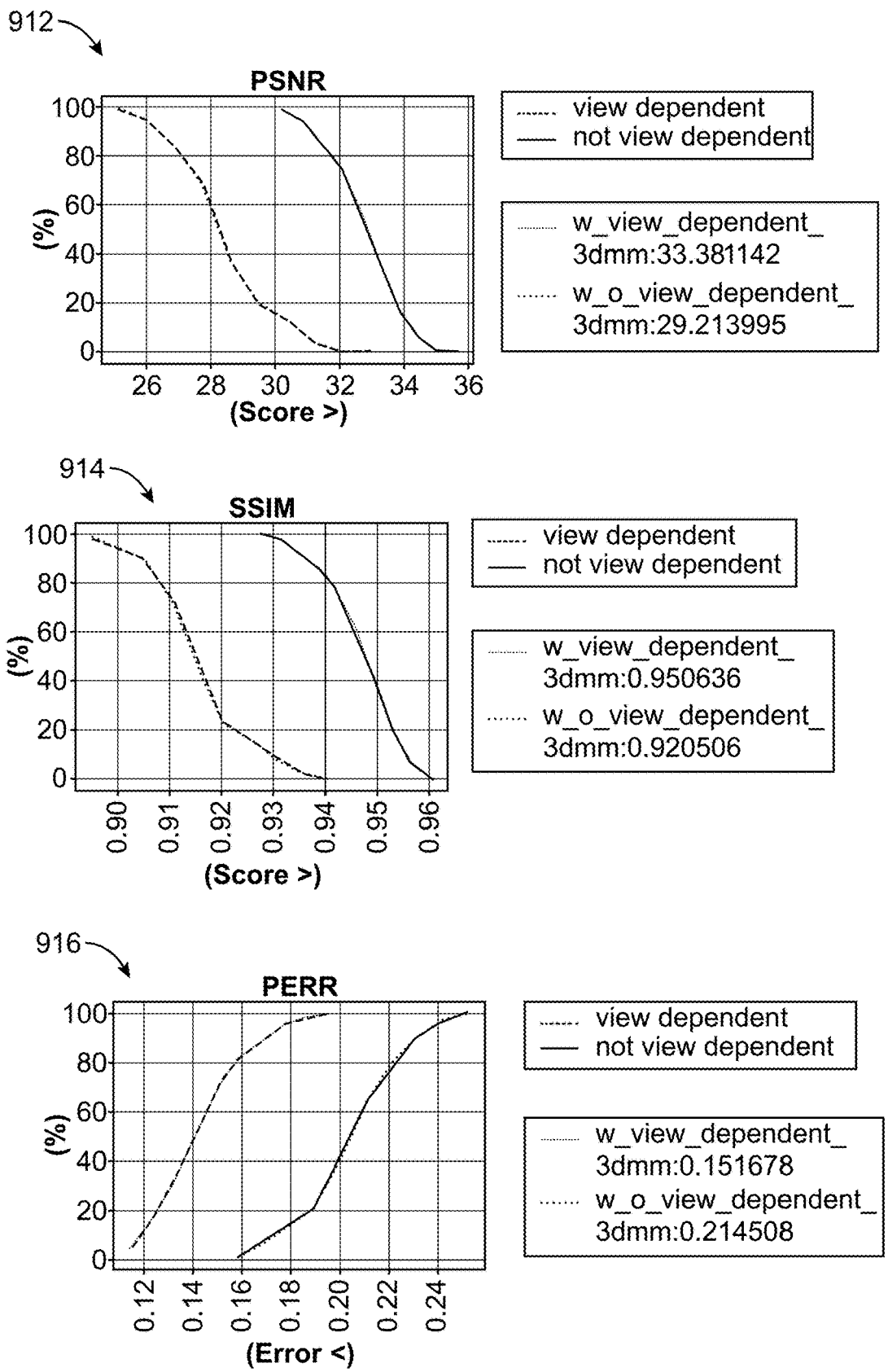

FIG. 9A and FIG. 9B illustrate example CDFs of performance metrics of a view dependent 3D modeling system (e.g., 3D model engine 400 of FIG. 4) compared with a non view dependent 3D modeling system (e.g., trained using the loss function in Equation (4)). The plots 902, 904, 906 of FIG. 9A correspond to 3D models generated based on a group of test images of a first subject (e.g., images of a first person captured with different views/poses). Similarly, the plots 912, 914, 916 of FIG. 9B correspond to 3D models generated based on a group of test images of a second subject (e.g., images of a second person captured with different views/poses). In each of the plots 902, 904, 906, 912, 914, 916, the dashed lines are plots for a 3D model generated using a view dependent 3D model engine (e.g., view dependent 3D model engine 400 of FIG. 4). In each of the plots 902, 904, 906, 912, 914, 916, the solid lines are plots for a 3D model generating using a non view dependent 3D modeling system. FIG. 9A and FIG. 9B include plots of peak signal-to-noise ratio (PSNR) in plots 902, 912 structural similarity (SSIM) in plots 904, 914, and perceptual error (PERR) in plots 906, 916. In some cases, the PERR can be computed by determining a MSE based on 2D images projected from 3D models generated from the group of test images. In one illustrative example, the 2D images projected from the 3D models generated from the group of test images can be processed by a pretrained Visual Geometry Group neutral network including 16 convolutional layers (e.g., a VGG16 network) to generate the MSE.

In plots 902, 912 the horizontal axis represents a PSNR score and the vertical axis represents the percentage of images in the corresponding group of testing images that produced a PSNR score greater than the horizontal axis PSNR score value. In the illustrated plots 902, 912, a lower PSNR score indicates better performance of the underlying 3D modeling system that generated the 3D model in the test configuration.

In plots 904, 914, the horizontal axis represents a SSIM score and the vertical axis represents the percentages of images in the corresponding group of testing images that produced a SSIM score greater than the horizontal axis SSIM score value. In the illustrated plots 904, 912, a lower SSIM score indicates better performance of the underlying 3D modeling system that generated the 3D model in the test configuration.

In plots 906, 916, the horizontal axis represents a 3D vertex perceptual error (PERR) and the vertical axis represents the percentages of images in the corresponding group of testing images that produced a PERR less than the horizontal axis PERR value. In the illustrated plots 904, 912, a lower PERR indicates better performance of the underlying 3D modeling system that generated the 3D model in the test configuration.

In each of the plots 902, 904, 906, 912, 914, 916, the view dependent 3D modeling system performed better than the non view dependent 3D modeling system. Accordingly, FIG. 9A and FIG. 9B provide illustrative examples of the benefits of generating a 3D model using a view dependent 3D modeling system (e.g., 3D modeling system 300 of FIG. 3 view dependent 3D model engine 400 of FIG. 4) according to examples of the present disclosure.

Figure 10:
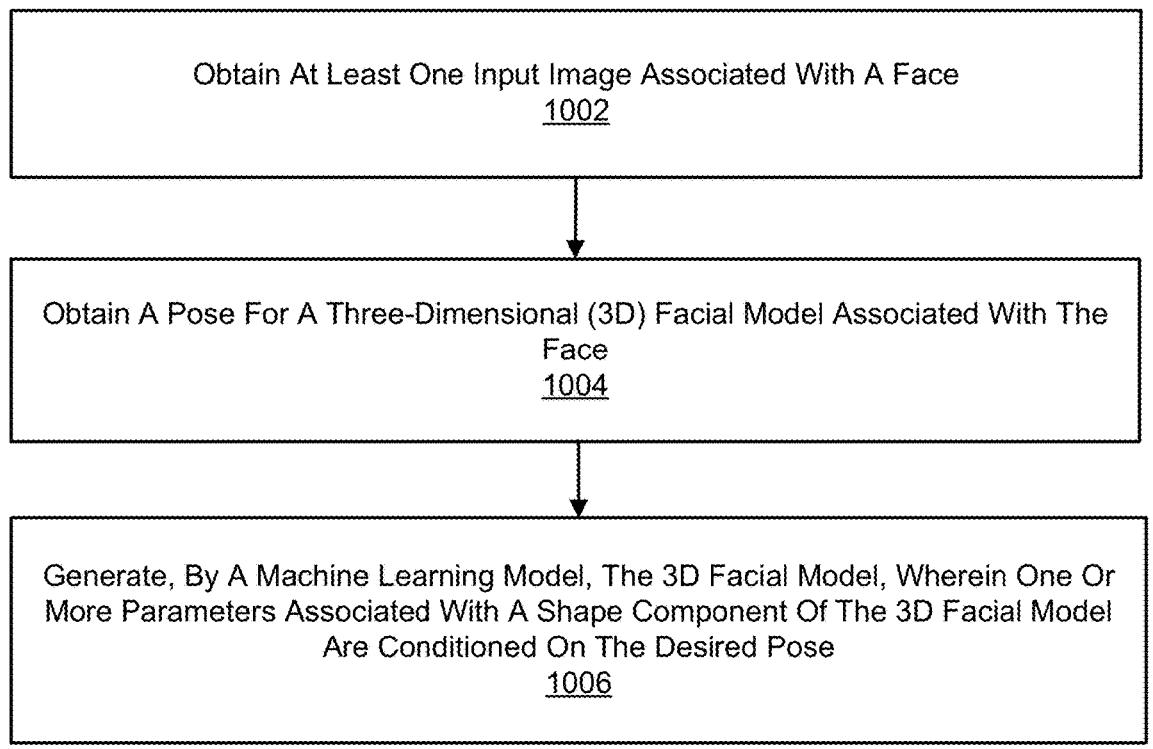
FIG. 10 is a flow diagram illustrating an example of a process for generating a 3D model, in accordance with some examples.

FIG. 10 illustrates a flowchart of a process 1000 for training one or more machine learning models. At block 1002, the process 1000 includes obtaining at least one input image associated with a face (e.g., frames 302 of FIG. 3, input images 402 of FIG. 4). In some examples, the at least one input image associated with the face includes two or more partial images of the face. In some cases, the at least one input image associated with the face includes an image of a left eye of the face (e.g., partial facial image 502 of FIG. 5), an image of a right eye of the face (e.g., partial facial image 504 of FIG. 5), and an image of a mouth of the face (e.g., partial facial image 506 of FIG. 5).

At block 1004, the process 1000 includes obtaining a pose (e.g., view 303 of FIG. 3, view 403 of FIG. 4) for a 3D facial model associated with the face. In some cases, the pose for the 3D facial model associated with the face comprises a pitch, a yaw, and a roll.

At block 1006, the process 1000 includes generating, by a machine learning model (e.g., 3D model engine 306 of FIG. 3, view dependent 3D model engine 400 of FIG. 4), the 3D facial model. In some cases, one or more parameters associated with a shape component of the 3D facial model are conditioned on the desired pose. In some cases, the 3D facial model is configured to vary in shape based on the pose for the 3D facial model associated with the face. In some examples, the one or more parameters associated with the shape component of the 3D facial model include coefficients of the shape component (e.g., shape coefficients $a_i$) of the 3D facial model. In some cases, the one or more parameters associated with the shape component of the 3D model include facial shape basis vectors (facial shape basis vectors $U_i$ of Equation (1)) of the 3D facial model. In some implementations, the 3D facial model further comprises a mean face component and a facial expression component. In some examples, the 3D facial model includes a combination of the mean face component, the shape component, and the facial expression component.

In some cases, generating the 3D facial model includes generating one or more facial image feature vectors based on the at least one input image associated with the face, generating a pose feature vector based on the pose for the 3D facial model, and generating, based on the one or more facial image feature vectors and the pose feature vector, a plurality of 3D facial model coefficients associated with the 3D facial model. In some cases, generating the one or more facial image feature vectors includes generating a first facial image feature vector based on the image of the left eye of the face, generating a second facial image feature vector based on the image of the right eye of the face, and generating a third facial image feature vector based on the image of the mouth of the face. In some cases, the process 1000 further includes combining the first facial image feature vector with the pose feature vector, combining the second facial image feature vector with the pose feature vector, and combining the third facial image feature vector with the pose feature vector. In some implementations, combining the first facial image feature vector, the second facial image feature vector, and the third facial image feature vector with the pose feature vector includes performing an element-wise sum of the first facial image feature vector and the pose feature vector, performing an element-wise sum of the second facial image feature vector and the pose feature vector, and performing an element-wise sum of the third facial image feature vector and the pose feature vector (see, e.g., summation blocks 408 of FIG. 4).

In some examples, the process 1000 further includes obtaining an additional pose for an additional 3D facial model associated with the face, wherein the additional pose for the additional 3D facial model associated with the face is different from the pose for the 3D facial model associated with the face. In some examples, the process 1000 includes generating, by the machine learning model, the additional 3D facial model associated with the face. In some cases, at least one parameter of one or more additional parameters associated with a shape component of the additional 3D facial model is different from at least one parameter of the one or more parameters associated with the shape component of the 3D facial model. In some examples, the additional 3D facial model is generated based on the at least one input image associated with the face. In some aspects, the 3D facial model associated with the face and the additional 3D facial model associated with the face comprise a common facial expression. In some cases, the process 1000 further includes obtaining at least one additional input image associated with the face. In some implementations, the additional 3D facial model is generated based on the at least one additional input image associated with the face. In some cases, the at least one input image associated with the face is associated with a first facial expression and the at least one additional input image associated with the face is associated with a second facial expression. In some examples, the first facial expression and the second facial expression are different.

In some examples, a device may include an application or function to perform some of the processes described herein (e.g., process 1000 and/or any other process described herein). In some examples, the processes described herein (e.g., process 1000 and/or any other process described herein) may be performed by a computing device or apparatus. In some examples, the process 1000 can be performed by the 3D modeling system 300 of FIG. 3, and/or view dependent 3D model engine 400 of FIG. 4 above. In another example, process 1000 can be performed by a computing device or system with the architecture of the computing system 1300 shown in FIG. 13.

The computing device can include any suitable device, such as a mobile device (e.g., a mobile phone), a desktop computing device, a tablet computing device, an extended reality (XR) device or system (e.g., a VR headset, an AR headset, AR glasses, or other XR device or system), a wearable device (e.g., a network-connected watch or smartwatch, or other wearable device), a server computer or system, a vehicle or computing device of a vehicle (e.g., an autonomous vehicle), a robotic device, a television, and/or any other computing device with the resource capabilities to perform the processes described herein, including the process 1000, 1000. In some cases, the computing device or apparatus may include various components, such as one or more input devices, one or more output devices, one or more processors, one or more microprocessors, one or more microcomputers, one or more cameras, one or more sensors, and/or other component(s) that are configured to carry out the steps of processes described herein. In some examples, the computing device may include a display, a network interface configured to communicate and/or receive the data, any combination thereof, and/or other component(s). The network interface may be configured to communicate and/or receive Internet Protocol (IP) based data or other type of data.

The components of the computing device can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein.

The process 1000 is illustrated as a logical flow diagram, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process 1000 and/or other processes described herein may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

Figure 11:
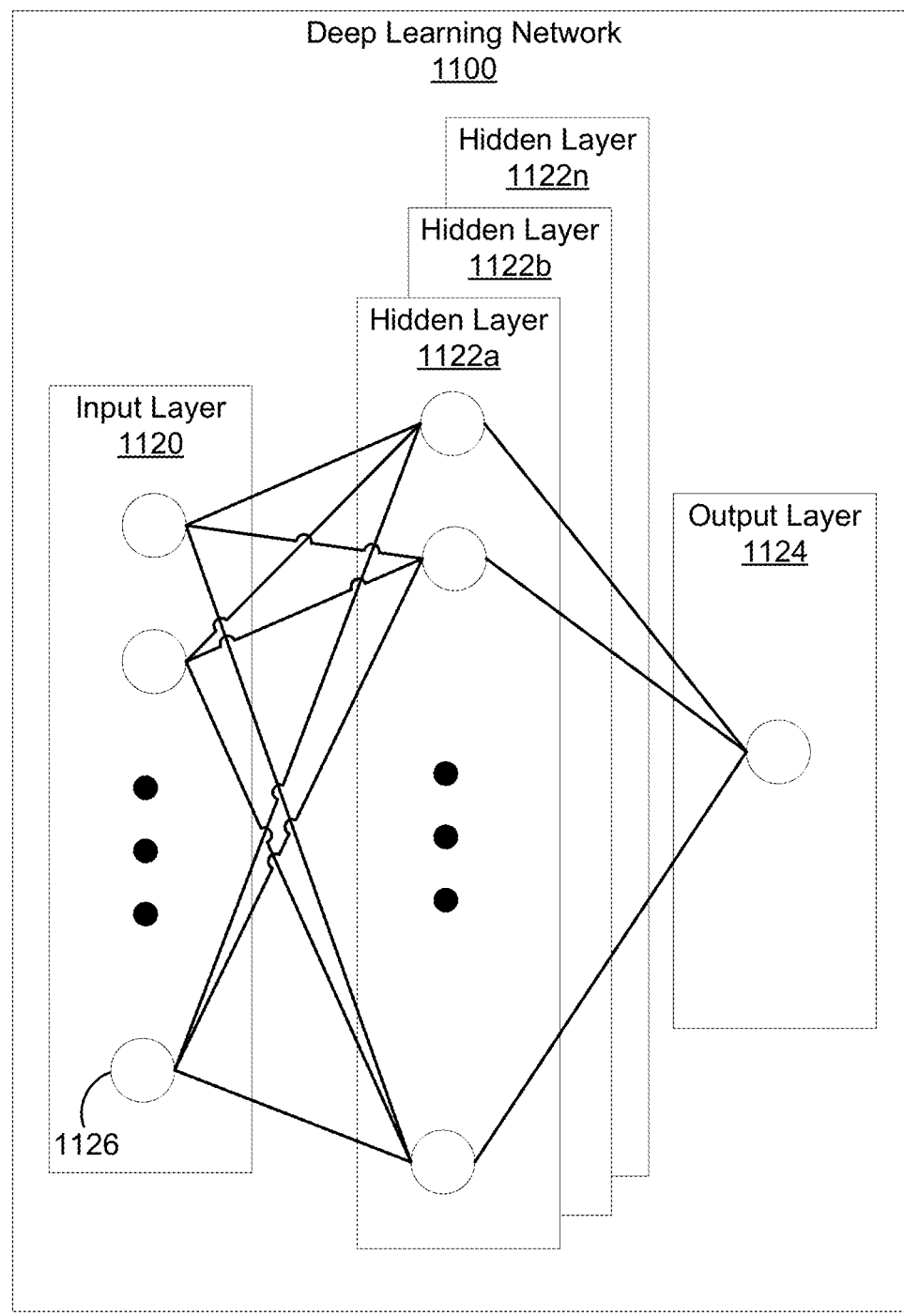
FIG. 11 is a block diagram illustrating an example of a deep learning network, in accordance with some examples.

FIG. 11 is an illustrative example of a deep learning neural network 1100 that can be used by a 3D model training system. An input layer 1120 includes input data. In one illustrative example, the input layer 1120 can include data representing the pixels of an input video frame. The neural network 1100 includes multiple hidden layers 1122*a*, 1122*b*, through 1122*n*. The hidden layers 1122*a*, 1122*b*, through 1122*n* include "n" number of hidden layers, where "n" is an integer greater than or equal to one. The number of hidden layers can be made to include as many layers as needed for the given application. The neural network 1100 further includes an output layer 1124 that provides an output resulting from the processing performed by the hidden layers 1122*a*, 1122*b*, through 1122*n*. In one illustrative example, the output layer 1124 can provide a classification for an object in an input video frame. The classification can include a class identifying the type of object (e.g., a person, a dog, a cat, or other object).

The neural network 1100 is a multi-layer neural network of interconnected nodes. Each node can represent a piece of information. Information associated with the nodes is shared among the different layers and each layer retains information as information is processed. In some cases, the neural network 1100 can include a feed-forward network, in which case there are no feedback connections where outputs of the network are fed back into itself. In some cases, the neural network 1100 can include a recurrent neural network, which can have loops that allow information to be carried across nodes while reading in input.

Information can be exchanged between nodes through node-to-node interconnections between the various layers. Nodes of the input layer 1120 can activate a set of nodes in the first hidden layer 1122*a*. For example, as shown, each of the input nodes of the input layer 1120 is connected to each of the nodes of the first hidden layer 1122*a*. The nodes of the hidden layers 1122*a*, 1122*b*, through 1122*n* can transform the information of each input node by applying activation functions to the information. The information derived from the transformation can then be passed to and can activate the nodes of the next hidden layer 1122b, which can perform their own designated functions. Example functions include convolutional, up-sampling, data transformation, and/or any other suitable functions. The output of the hidden layer 1122b can then activate nodes of the next hidden layer, and so on. The output of the last hidden layer 1122n can activate one or more nodes of the output layer 1124, at which an output is provided. In some cases, while nodes (e.g., node 1126) in the neural network 1100 are shown as having multiple output lines, a node has a single output and all lines shown as being output from a node represent the same output value.

In some cases, each node or interconnection between nodes can have a weight that is a set of parameters derived from the training of the neural network 1100. Once the neural network 1100 is trained, it can be referred to as a trained neural network, which can be used to classify one or more objects. For example, an interconnection between nodes can represent a piece of information learned about the interconnected nodes. The interconnection can have a tunable numeric weight that can be tuned (e.g., based on a training dataset), allowing the neural network 1100 to be adaptive to inputs and able to learn as more and more data is processed.

The neural network 1100 is pre-trained to process the features from the data in the input layer 1120 using the different hidden layers 1122a, 1122b, through 1122n in order to provide the output through the output layer 1124. In an example in which the neural network 1100 is used to identify objects in images, the neural network 1100 can be trained using training data that includes both images and labels. For instance, training images can be input into the network, with each training image having a label indicating the classes of the one or more objects in each image (basically, indicating to the network what the objects are and what features they have). In one illustrative example, a training image can include an image of a number 2, in which case the label for the image can be [0 0 1 0 0 0 0 0 0 0].

In some cases, the neural network 1100 can adjust the weights of the nodes using a training process called backpropagation. Backpropagation can include a forward pass, a loss function, a backward pass, and a weight update. The forward pass, loss function, backward pass, and parameter update is performed for one training iteration. The process can be repeated for a certain number of iterations for each set of training images until the neural network 1100 is trained well enough so that the weights of the layers are accurately tuned.

For the example of identifying objects in images, the forward pass can include passing a training image through the neural network 1100. The weights are initially randomized before the neural network 1100 is trained. The image can include, for example, an array of numbers representing the pixels of the image. Each number in the array can include a value from 0 to 255 describing the pixel intensity at that position in the array. In one example, the array can include a 28×28×3 array of numbers with 28 rows and 28 columns of pixels and 3 color components (such as red, green, and blue, or luma and two chroma components, or the like).

For a first training iteration for the neural network 1100, the output will likely include values that do not give preference to any particular class due to the weights being randomly selected at initialization. For example, if the output is a vector with probabilities that the object includes different classes, the probability value for each of the different classes may be equal or at least very similar (e.g., for ten possible classes, each class may have a probability value of 0.1). With the initial weights, the neural network 1100 is unable to determine low level features and thus cannot make an accurate determination of what the classification of the object might be. A loss function can be used to analyze error in the output. Any suitable loss function definition can be used. One example of a loss function includes a mean squared error (MSE). The MSE is defined as $E_{total}=\Sigma_{1/2}$ (target−output)$^2$, which calculates the sum of one-half times the actual answer minus the predicted (output) answer squared. The loss can be set to be equal to the value of $E_{total}$.

The loss (or error) will be high for the first training images since the actual values will be much different than the predicted output. The goal of training is to minimize the amount of loss so that the predicted output is the same as the training label. The neural network 1100 can perform a backward pass by determining which inputs (weights) most contributed to the loss of the network, and can adjust the weights so that the loss decreases and is eventually minimized.

A derivative of the loss with respect to the weights (denoted as dL/dW, where W are the weights at a particular layer) can be computed to determine the weights that contributed most to the loss of the network. After the derivative is computed, a weight update can be performed by updating all the weights of the filters. For example, the weights can be updated so that they change in the opposite direction of the gradient. The weight update can be denoted as $$w = w_i - \eta \frac{dL}{dW},$$

where w denotes a weight, $w_i$ denotes the initial weight, and η denotes a learning rate. The learning rate can be set to any suitable value, with a high learning rate including larger weight updates and a lower value indicating smaller weight updates.

The neural network 1100 can include any suitable deep network. One example includes a convolutional neural network (CNN), which includes an input layer and an output layer, with multiple hidden layers between the input and out layers. An example of a CNN is described below with respect to FIG. 11. The hidden layers of a CNN include a series of convolutional, nonlinear, pooling (for downsampling), and fully connected layers. The neural network 1100 can include any other deep network other than a CNN, such as an autoencoder, a deep belief nets (DBNs), a Recurrent Neural Networks (RNNs), among others.

Figure 12:
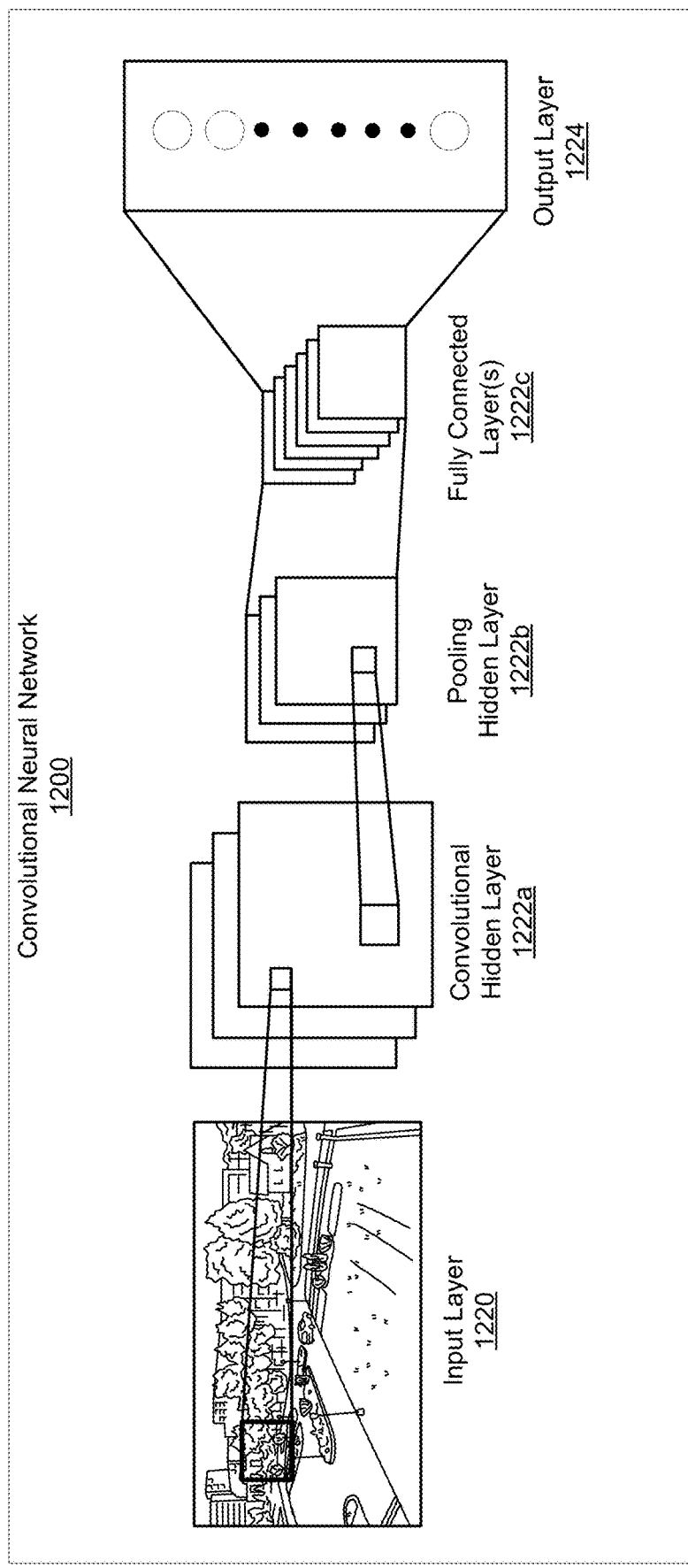
FIG. 12 is a block diagram illustrating an example of a convolutional neural network, in accordance with some examples.

FIG. 12 is an illustrative example of a convolutional neural network 1200 (CNN 1200). The input layer 1220 of the CNN 1200 includes data representing an image. For example, the data can include an array of numbers representing the pixels of the image, with each number in the array including a value from 0 to 255 describing the pixel intensity at that position in the array. Using the previous example from above, the array can include a 28×28×3 array of numbers with 28 rows and 28 columns of pixels and 3 color components (e.g., red, green, and blue, or luma and two chroma components, or the like). The image can be passed through a convolutional hidden layer 1222a, an optional non-linear activation layer, a pooling hidden layer 1222b, and fully connected hidden layers 1222c to get an output at the output layer 1224. While only one of each hidden layer is shown in FIG. 12, one of ordinary skill will appreciate that multiple convolutional hidden layers, non-linear layers, pooling hidden layers, and/or fully connected layers can be included in the CNN 1200. As previously described, the output can indicate a single class of an object or can include a probability of classes that best describe the object in the image.

The first layer of the CNN 1200 is the convolutional hidden layer 1222a. The convolutional hidden layer 1222a analyzes the image data of the input layer 1220. Each node of the convolutional hidden layer 1222a is connected to a region of nodes (pixels) of the input image called a receptive field. The convolutional hidden layer 1222a can be considered as one or more filters (each filter corresponding to a different activation or feature map), with each convolutional iteration of a filter being a node or neuron of the convolutional hidden layer 1222a. For example, the region of the input image that a filter covers at each convolutional iteration would be the receptive field for the filter. In one illustrative example, if the input image includes a 28×28 array, and each filter (and corresponding receptive field) is a 5×5 array, then there will be 24×24 nodes in the convolutional hidden layer 1222a. Each connection between a node and a receptive field for that node learns a weight and, in some cases, an overall bias such that each node learns to analyze its particular local receptive field in the input image. Each node of the hidden layer 1222a will have the same weights and bias (called a shared weight and a shared bias). For example, the filter has an array of weights (numbers) and the same depth as the input. A filter will have a depth of 3 for the video frame example (according to three color components of the input image). An illustrative example size of the filter array is 5×5×3, corresponding to a size of the receptive field of a node.

The convolutional nature of the convolutional hidden layer 1222a is due to each node of the convolutional layer being applied to its corresponding receptive field. For example, a filter of the convolutional hidden layer 1222a can begin in the top-left corner of the input image array and can convolve around the input image. As noted above, each convolutional iteration of the filter can be considered a node or neuron of the convolutional hidden layer 1222a. At each convolutional iteration, the values of the filter are multiplied with a corresponding number of the original pixel values of the image (e.g., the 5×5 filter array is multiplied by a 5×5 array of input pixel values at the top-left corner of the input image array). The multiplications from each convolutional iteration can be summed together to obtain a total sum for that iteration or node. The process is next continued at a next location in the input image according to the receptive field of a next node in the convolutional hidden layer 1222a.

For example, a filter can be moved by a step amount to the next receptive field. The step amount can be set to 1 or other suitable amount. For example, if the step amount is set to 1, the filter will be moved to the right by 1 pixel at each convolutional iteration. Processing the filter at each unique location of the input volume produces a number representing the filter results for that location, resulting in a total sum value being determined for each node of the convolutional hidden layer 1222a.

The mapping from the input layer to the convolutional hidden layer 1222a is referred to as an activation map (or feature map). The activation map includes a value for each node representing the filter results at each locations of the input volume. The activation map can include an array that includes the various total sum values resulting from each iteration of the filter on the input volume. For example, the activation map will include a 24×24 array if a 5×5 filter is applied to each pixel (a step amount of 1) of a 28×28 input image. The convolutional hidden layer 1222a can include several activation maps in order to identify multiple features in an image. The example shown in FIG. 12 includes three activation maps. Using three activation maps, the convolutional hidden layer 1222a can detect three different kinds of features, with each feature being detectable across the entire image.

In some examples, a non-linear hidden layer can be applied after the convolutional hidden layer 1222a. The non-linear layer can be used to introduce non-linearity to a system that has been computing linear operations. One illustrative example of a non-linear layer is a rectified linear unit (ReLU) layer. A ReLU layer can apply the function $f(x)=\max(0, x)$ to all of the values in the input volume, which changes all the negative activations to 0. The ReLU can thus increase the non-linear properties of the CNN 1200 without affecting the receptive fields of the convolutional hidden layer 1222a.

The pooling hidden layer 1222b can be applied after the convolutional hidden layer 1222a (and after the non-linear hidden layer when used). The pooling hidden layer 1222b is used to simplify the information in the output from the convolutional hidden layer 1222a. For example, the pooling hidden layer 1222b can take each activation map output from the convolutional hidden layer 1222a and generates a condensed activation map (or feature map) using a pooling function. Max-pooling is one example of a function performed by a pooling hidden layer. Other forms of pooling functions be used by the pooling hidden layer 1222a, such as average pooling, L2-norm pooling, or other suitable pooling functions. A pooling function (e.g., a max-pooling filter, an L2-norm filter, or other suitable pooling filter) is applied to each activation map included in the convolutional hidden layer 1222a. In the example shown in FIG. 12, three pooling filters are used for the three activation maps in the convolutional hidden layer 1222a.

In some examples, max-pooling can be used by applying a max-pooling filter (e.g., having a size of 2×2) with a step amount (e.g., equal to a dimension of the filter, such as a step amount of 2) to an activation map output from the convolutional hidden layer 1222a. The output from a max-pooling filter includes the maximum number in every sub-region that the filter convolves around. Using a 2×2 filter as an example, each unit in the pooling layer can summarize a region of 2×2 nodes in the previous layer (with each node being a value in the activation map). For example, four values (nodes) in an activation map will be analyzed by a 2×2 max-pooling filter at each iteration of the filter, with the maximum value from the four values being output as the "max" value. If such a max-pooling filter is applied to an activation filter from the convolutional hidden layer 1222a having a dimension of 24×24 nodes, the output from the pooling hidden layer 1222b will be an array of 12×12 nodes.

In some examples, an L2-norm pooling filter could also be used. The L2-norm pooling filter includes computing the square root of the sum of the squares of the values in the 2×2 region (or other suitable region) of an activation map (instead of computing the maximum values as is done in max-pooling), and using the computed values as an output.

Intuitively, the pooling function (e.g., max-pooling, L2-norm pooling, or other pooling function) determines whether a given feature is found anywhere in a region of the image, and discards the exact positional information. This can be done without affecting results of the feature detection because, once a feature has been found, the exact location of the feature is not as important as its approximate location relative to other features. Max-pooling (as well as other pooling methods) offer the benefit that there are many fewer pooled features, thus reducing the number of parameters needed in later layers of the CNN 1200.

The final layer of connections in the network is a fully-connected layer that connects every node from the pooling hidden layer 1222*b* to every one of the output nodes in the output layer 1224. Using the example above, the input layer includes 28×28 nodes encoding the pixel intensities of the input image, the convolutional hidden layer 1222*a* includes 3×24×24 hidden feature nodes based on application of a 5×5 local receptive field (for the filters) to three activation maps, and the pooling layer 1222*b* includes a layer of 3×12×12 hidden feature nodes based on application of max-pooling filter to 2×2 regions across each of the three feature maps. Extending this example, the output layer 1224 can include ten output nodes. In such an example, every node of the 3×12×12 pooling hidden layer 1222*b* is connected to every node of the output layer 1224.

The fully connected layer 1222*c* can obtain the output of the previous pooling layer 1222*b* (which should represent the activation maps of high-level features) and determines the features that most correlate to a particular class. For example, the fully connected layer 1222*c* layer can determine the high-level features that most strongly correlate to a particular class, and can include weights (nodes) for the high-level features. A product can be computed between the weights of the fully connected layer 1222*c* and the pooling hidden layer 1222*b* to obtain probabilities for the different classes. For example, if the CNN 1200 is being used to predict that an object in a video frame is a person, high values will be present in the activation maps that represent high-level features of people (e.g., two legs are present, a face is present at the top of the object, two eyes are present at the top left and top right of the face, a nose is present in the middle of the face, a mouth is present at the bottom of the face, and/or other features common for a person).

In some examples, the output from the output layer 1224 can include an M-dimensional vector (in the prior example, M=10), where M can include the number of classes that the program has to choose from when classifying the object in the image. Other example outputs can also be provided. Each number in the N-dimensional vector can represent the probability the object is of a certain class. In one illustrative example, if a 10-dimensional output vector represents ten different classes of objects is [0 0 0.05 0.8 0 0.15 0 0 0 0], the vector indicates that there is a 5% probability that the image is the third class of object (e.g., a dog), an 80% probability that the image is the fourth class of object (e.g., a human), and a 15% probability that the image is the sixth class of object (e.g., a kangaroo). The probability for a class can be considered a confidence level that the object is part of that class.

Figure 13:
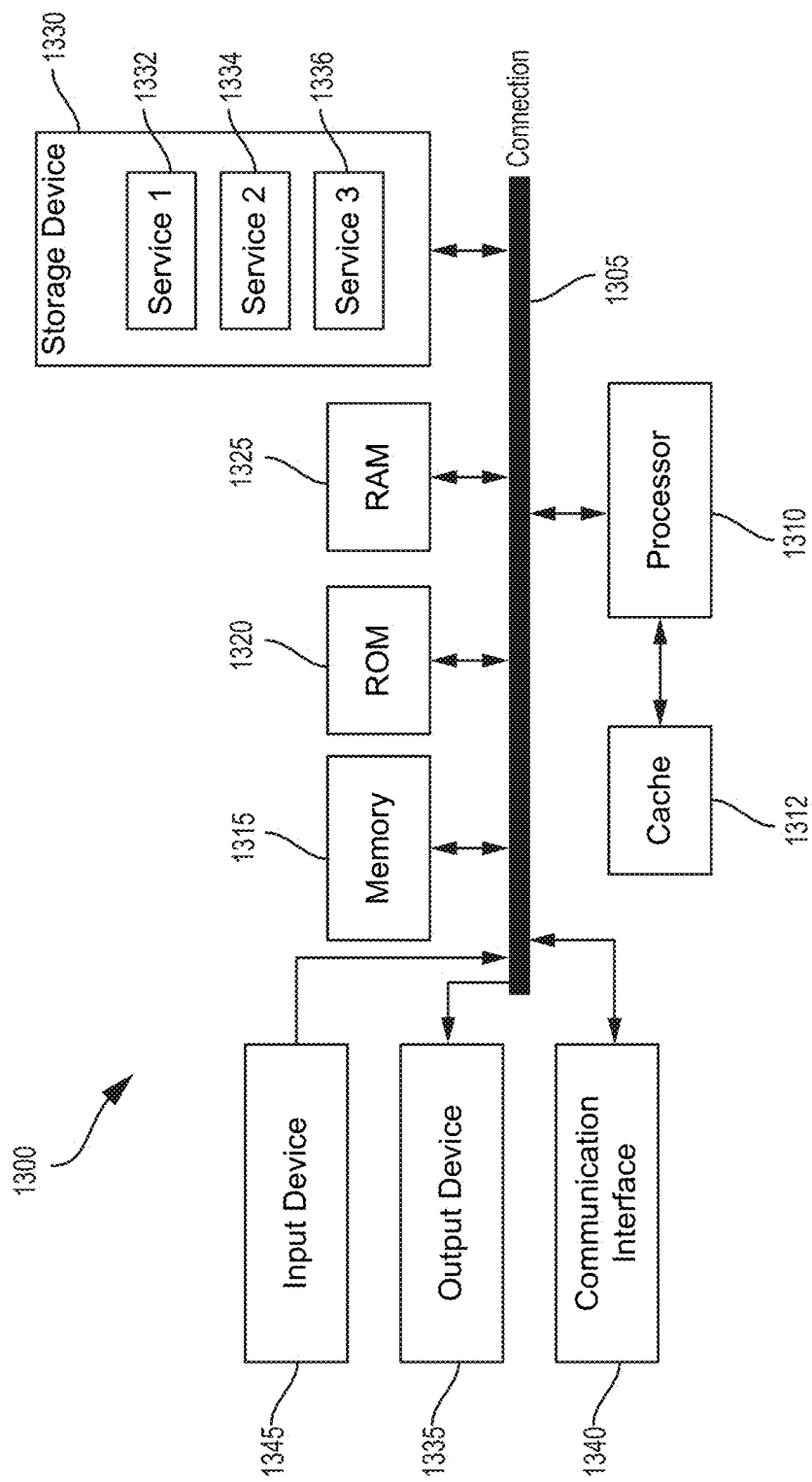
FIG. 13 is a diagram illustrating an example of a system for implementing certain aspects described herein.

FIG. 13 is a diagram illustrating an example of a system for implementing certain aspects of the present technology. In particular, FIG. 13 illustrates an example of computing system 1300, which can be for example any computing device making up internal computing system, a remote computing system, a camera, or any component thereof in which the components of the system are in communication with each other using connection 1305. Connection 1305 can be a physical connection using a bus, or a direct connection into processor 1310, such as in a chipset architecture. Connection 1305 can also be a virtual connection, networked connection, or logical connection.

In some embodiments, computing system 1300 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 1300 includes at least one processing unit (CPU or processor) 1310 and connection 1305 that couples various system components including system memory 1315, such as read-only memory (ROM) 1320 and random access memory (RAM) 1325 to processor 1310. Computing system 1300 can include a cache 1312 of high-speed memory connected directly with, in close proximity to, or integrated as part of processor 1310.

Processor 1310 can include any general purpose processor and a hardware service or software service, such as services 1332, 1334, and 1336 stored in storage device 1330, configured to control processor 1310 as well as a special-purpose processor where software instructions are incorporated into the actual processor design. Processor 1310 may essentially be a completely self-contained computing system, containing multiple cores or processors, a bus, memory controller, cache, etc. A multi-core processor may be symmetric or asymmetric.

To enable user interaction, computing system 1300 includes an input device 1345, which can represent any number of input mechanisms, such as a microphone for speech, a touch-sensitive screen for gesture or graphical input, keyboard, mouse, motion input, speech, etc. Computing system 1300 can also include output device 1335, which can be one or more of a number of output mechanisms. In some instances, multimodal systems can enable a user to provide multiple types of input/output to communicate with computing system 1300. Computing system 1300 can include communications interface 1340, which can generally govern and manage the user input and system output. The communication interface may perform or facilitate receipt and/or transmission wired or wireless communications using wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof. The communications interface 1340 may also include one or more Global Navigation Satellite System (GNSS) receivers or transceivers that are used to determine a location of the computing system 1300 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 1330 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (L1/L2/L3/L4/L5/L #), resistive random-access memory (RRAM/ReRAM), phase change memory (PCM), spin transfer torque RAM (STT-RAM), another memory chip or cartridge, and/or a combination thereof.

The storage device 1330 can include software services, servers, services, etc., that when the code that defines such software is executed by the processor 1310, it causes the system to perform a function. In some embodiments, a hardware service that performs a particular function can include the software component stored in a computer-readable medium in connection with the necessary hardware components, such as processor 1310, connection 1305, output device 1335, etc., to carry out the function.

As used herein, the term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted using any suitable means including memory sharing, message passing, token passing, network transmission, or the like.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the embodiments and examples provided herein. However, it will be understood by one of ordinary skill in the art that the embodiments may be practiced without these specific details. For clarity of explanation, in some instances the present technology may be presented as including individual functional blocks including functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Individual embodiments may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, mobile phones (e.g., smartphones or other types of mobile phones), tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific embodiments thereof, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

The various illustrative logical blocks, modules, circuits, and algorithm steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

Illustrative aspects of the disclosure include:

Aspect 1: A method of generating a three-dimensional (3D) facial model, the method comprising: obtaining at least one input image associated with a face; obtaining a pose for a 3D facial model associated with the face; and generating, by a machine learning model, the 3D facial model associated with the face, wherein one or more parameters associated with a shape component of the 3D facial model are conditioned on the pose.

Aspect 2: The method of Aspect 1, wherein the 3D facial model is configured to vary in shape based on the pose for the 3D facial model associated with the face.

Aspect 3: The method of any of Aspects 1 to 2, wherein the pose for the 3D facial model comprises a pitch, a yaw, and a roll.

Aspect 4: The method of any of Aspects 1 to 3, wherein the one or more parameters associated with the shape component of the 3D facial model comprise coefficients of the shape component of the 3D facial model.

Aspect 5: The method of any of Aspects 1 to 4, wherein the 3D facial model further comprises a mean face component and a facial expression component, and wherein the 3D facial model comprises a combination of the mean face component, the shape component, and the facial expression component.

Aspect 6: The method of any of Aspects 1 to 5, further comprising: obtaining an additional pose for an additional 3D facial model associated with the face, wherein the additional pose for the additional 3D facial model associated with the face is different from the pose for the 3D facial model associated with the face; and generating, by the machine learning model, the additional 3D facial model associated with the face, wherein at least one parameter of one or more additional parameters associated with a shape component of the additional 3D facial model is different from at least one parameter of the one or more parameters associated with the shape component of the 3D facial model.

Aspect 7: The method of any of Aspects 1 to 6, wherein the additional 3D facial model is generated based on the at least one input image associated with the face.

Aspect 8: The method of any of Aspects 1 to 7, wherein the 3D facial model associated with the face and the additional 3D facial model associated with the face comprise a common facial expression.

Aspect 9: The method of any of Aspects 1 to 8, further comprising obtaining at least one additional input image associated with the face, wherein the additional 3D facial model is generated based on the at least one additional input image associated with the face, wherein: the at least one input image associated with the face is associated with a first facial expression; the at least one additional input image associated with the face is associated with a second facial expression; and the first facial expression and the second facial expression are different.

Aspect 10: The method of any of Aspects 1 to 9, wherein generating the 3D facial model comprises: generating one or more facial image feature vectors based on the at least one input image associated with the face; generating a pose feature vector based on the pose for the 3D facial model; and generating, based on the one or more facial image feature vectors and the pose feature vector, a plurality of 3D facial model coefficients associated with the 3D facial model.

Aspect 11: The method of any of Aspects 1 to 10, wherein the at least one input image associated with the face comprises two or more partial images of the face.

Aspect 12: The method of any of Aspects 1 to 11, wherein the at least one input image associated with the face comprises an image of a left eye of the face, an image of a right eye of the face, and an image of a mouth of the face.

Aspect 13: The method of any of Aspects 1 to 12, wherein generating the one or more facial image feature vectors comprises: generating a first facial image feature vector based on the image of the left eye of the face; generating a second facial image feature vector based on the image of the right eye of the face; and generating a third facial image feature vector based on the image of the mouth of the face.

Aspect 14: The method of any of Aspects 1 to 13, further comprising: combining the first facial image feature vector with the pose feature vector; combining the second facial image feature vector with the pose feature vector; and combining the third facial image feature vector with the pose feature vector.

Aspect 15: The method of any of Aspects 1 to 14, wherein combining the first facial image feature vector, the second facial image feature vector, and the third facial image feature vector with the pose feature vector comprises: performing an element-wise sum of the first facial image feature vector and the pose feature vector; performing an element-wise sum of the second facial image feature vector and the pose feature vector; and performing an element-wise sum of the third facial image feature vector and the pose feature vector.

Aspect 16: An apparatus for generating a 3D facial model, comprising a memory and at least one processor (e.g., implemented in circuitry) coupled to the memory. The memory can be configured to store data, such as system memory 1315, read-only memory (ROM) 1320 and/or random access memory (RAM) 1325 to processor 1310. The at least one processor is configured to: obtain at least one input image associated with a face; obtain a pose for a 3D facial model associated with the face; and generate, by a machine learning model, the 3D facial model associated with the face, wherein one or more parameters associated with a shape component of the 3D facial model are conditioned on the pose.

Aspect 17: The apparatus of Aspect 16, wherein the 3D facial model is configured to vary in shape based on the pose for the 3D facial model associated with the face.

Aspect 18: The apparatus of any of Aspects 16 to 17, wherein the pose for the 3D facial model comprises a pitch, a yaw, and a roll.

Aspect 19: The apparatus of any of Aspects 16 to 18, wherein the one or more parameters associated with the shape component of the 3D facial model comprise coefficients of the shape component of the 3D facial model.

Aspect 20: The apparatus of any of Aspects 16 to 19, wherein the 3D facial model further comprises a mean face component and a facial expression component, and wherein the 3D facial model comprises a combination of the mean face component, the shape component, and the facial expression component.

Aspect 21: The apparatus of any of Aspects 16 to 20, wherein the at least one product is configured to: obtain an additional pose for an additional 3D facial model associated with the face, wherein the additional pose for the additional 3D facial model associated with the face is different from the pose for the 3D facial model associated with the face; and generate, by the machine learning model, the additional 3D facial model associated with the face, wherein at least one parameter of one or more additional parameters associated with a shape component of the additional 3D facial model is different from at least one parameter of the one or more parameters associated with the shape component of the 3D facial model.

Aspect 22: The apparatus of any of Aspects 16 to 21, wherein the additional 3D facial model is generated based on the at least one input image associated with the face.

Aspect 23: The apparatus of any of Aspects 16 to 22, wherein the 3D facial model associated with the face and the additional 3D facial model associated with the face comprise a common facial expression.

Aspect 24: The apparatus of any of Aspects 16 to 23, wherein the at least one processor is configured to: obtain at least one additional input image associated with the face, wherein the additional 3D facial model is generated based on the at least one additional input image associated with the face, wherein: the at least one input image associated with the face is associated with a first facial expression; the at least one additional input image associated with the face is associated with a second facial expression; and the first facial expression and the second facial expression are different.

Aspect 25: The apparatus of any of Aspects 16 to 24, wherein the at least one processor is configured to: generate one or more facial image feature vectors based on the at least one input image associated with the face; generate a pose feature vector based on the pose for the 3D facial model; and generate, based on the one or more facial image feature vectors and the pose feature vector, a plurality of 3D facial model coefficients associated with the 3D facial model.

Aspect 26: The apparatus of any of Aspects 16 to 25, wherein the at least one input image associated with the face comprises two or more partial images of the face.

Aspect 27: The apparatus of any of Aspects 16 to 26, wherein the at least one input image associated with the face comprises an image of a left eye of the face, an image of a right eye of the face, and an image of a mouth of the face.

Aspect 28: The apparatus of any of Aspects 16 to 27, wherein the at least one processor is configured to: generate a first facial image feature vector based on the image of the left eye of the face; generate a second facial image feature vector based on the image of the right eye of the face; and generate a third facial image feature vector based on the image of the mouth of the face.

Aspect 29: The apparatus of any of Aspects 16 to 28, wherein the at least one processor is configured to: combine the first facial image feature vector with the pose feature vector; combine the second facial image feature vector with the pose feature vector; and combine the third facial image feature vector with the pose feature vector.

Aspect 30: The apparatus of any of Aspects 16 to 29, wherein combining the first facial image feature vector, the second facial image feature vector, and the third facial image feature vector with the pose feature vector comprises: perform an element-wise sum of the first facial image feature vector and the pose feature vector; perform an element-wise sum of the second facial image feature vector and the pose feature vector; and perform an element-wise sum of the third facial image feature vector and the pose feature vector.

Aspect 31: A non-transitory computer-readable storage medium having stored thereon instructions which, when executed by one or more processors, cause the one or more processors to perform any of the operations of aspects 1 to 30.

Aspect 32: An apparatus comprising one or more means for performing any of the operations of aspects 1 to 30.

What is claimed is:

1. A method of generating a three-dimensional (3D) facial model, the method comprising:
   obtaining, by an image input of a machine learning model, at least one input image associated with a face;
   generating, by the machine learning model based on the at least one input image associated with the face, a face feature vector, wherein the face feature vector encodes one or more features of the face;
   obtaining, by a pose input of the machine learning model, a pose for a 3D facial model associated with the face;
   generating, by the machine learning model based on the pose, a pose feature vector, wherein the pose feature vector encodes the pose, and wherein the pose is different from a pose of the face associated with the at least one input image;
   combining the face feature vector and the pose feature vector to generate a combined feature vector; and
   generating, by a neural network layer of the machine learning model based on the combined feature vector, the 3D facial model associated with the face, wherein one or more parameters associated with a shape component of the 3D facial model are conditioned on the pose.

2. The method of claim 1, wherein the 3D facial model is configured to vary in shape based on the pose for the 3D facial model associated with the face.

3. The method of claim 1, wherein the pose for the 3D facial model comprises a pitch, a yaw, and a roll.

4. The method of claim 1, wherein the one or more parameters associated with the shape component of the 3D facial model comprise coefficients of the shape component of the 3D facial model.

5. The method of claim 4, wherein the 3D facial model further comprises a mean face component and a facial expression component, and wherein the 3D facial model comprises a combination of the mean face component, the shape component, and the facial expression component.

6. The method of claim 1, further comprising:
   obtaining, by the pose input of the machine learning model, an additional pose for an additional 3D facial model associated with the face, wherein the additional pose for the additional 3D facial model associated with the face is different from the pose for the 3D facial model associated with the face; and
   generating, by the machine learning model, the additional 3D facial model associated with the face, wherein at least one parameter of one or more additional parameters associated with a shape component of the additional 3D facial model is different from at least one parameter of the one or more parameters associated with the shape component of the 3D facial model.

7. The method of claim 6, wherein the additional 3D facial model is generated based on the at least one input image associated with the face.

8. The method of claim 7, wherein the 3D facial model associated with the face and the additional 3D facial model associated with the face comprise a common facial expression.

9. The method of claim 6, further comprising obtaining at least one additional input image associated with the face, wherein the additional 3D facial model is generated based on the at least one additional input image associated with the face, wherein:
   the at least one input image associated with the face is associated with a first facial expression;
   the at least one additional input image associated with the face is associated with a second facial expression; and
   the first facial expression and the second facial expression are different.

10. The method of claim 1, wherein the at least one input image associated with the face comprises two or more partial images of the face.

11. The method of claim 10, wherein the at least one input image associated with the face comprises an image of a left eye of the face, an image of a right eye of the face, and an image of a mouth of the face.

12. The method of claim 11, wherein generating the one or more features of the face comprises:
generating a first facial image feature vector based on the image of the left eye of the face;
generating a second facial image feature vector based on the image of the right eye of the face; and
generating a third facial image feature vector based on the image of the mouth of the face.

13. The method of claim 12, further comprising:
combining the first facial image feature vector with the pose feature vector;
combining the second facial image feature vector with the pose feature vector; and
combining the third facial image feature vector with the pose feature vector.

14. The method of claim 13, wherein combining the first facial image feature vector, the second facial image feature vector, and the third facial image feature vector with the pose feature vector comprises:
performing an element-wise sum of the first facial image feature vector and the pose feature vector;
performing an element-wise sum of the second facial image feature vector and the pose feature vector; and
performing an element-wise sum of the third facial image feature vector and the pose feature vector.

15. The method of claim 1, wherein:
generating the face feature vector comprises processing the at least one input image through a first neural network layer of the machine learning model; and
generating the pose feature vector comprises processing the pose through a second neural network layer of the machine learning model, the second neural network layer being different from the first neural network layer.

16. An apparatus for generating a 3D facial model, comprising:
at least one memory; and
at least one processor coupled to the at least one memory and configured to:
obtain, using an image input of a machine learning model, at least one input image associated with a face;
generate, by the machine learning model based on the at least one input image associated with the face, a face feature vector, wherein the face feature vector encodes one or more features of the face;
obtain, using a pose input of the machine learning model, a pose for a 3D facial model associated with the face;
generate, by the machine learning model based on the pose, a pose feature vector, wherein the pose feature vector encodes the pose, and wherein the pose is different from a pose of the face associated with the at least one input image;
combine the face feature vector and the pose feature vector to generate a combined feature vector; and
generate, using a neural network layer of the machine learning model based on the combined feature vector, the 3D facial model associated with the face, wherein one or more parameters associated with a shape component of the 3D facial model are conditioned on the pose.

17. The apparatus of claim 16, wherein the 3D facial model is configured to vary in shape based on the pose for the 3D facial model associated with the face.

18. The apparatus of claim 16, wherein the pose for the 3D facial model comprises a pitch, a yaw, and a roll.

19. The apparatus of claim 16, wherein the one or more parameters associated with the shape component of the 3D facial model comprise coefficients of the shape component of the 3D facial model.

20. The apparatus of claim 19, wherein the 3D facial model further comprises a mean face component and a facial expression component, and wherein the 3D facial model comprises a combination of the mean face component, the shape component, and the facial expression component.

21. The apparatus of claim 16, wherein the at least one processor is configured to:
obtain, using the pose input of the machine learning model, an additional pose for an additional 3D facial model associated with the face, wherein the additional pose for the additional 3D facial model associated with the face is different from the pose for the 3D facial model associated with the face; and
generate, by the machine learning model, the additional 3D facial model associated with the face, wherein at least one parameter of one or more additional parameters associated with a shape component of the additional 3D facial model is different from at least one parameter of the one or more parameters associated with the shape component of the 3D facial model.

22. The apparatus of claim 21, wherein the additional 3D facial model is generated based on the at least one input image associated with the face.

23. The apparatus of claim 22, wherein the 3D facial model associated with the face and the additional 3D facial model associated with the face comprise a common facial expression.

24. The apparatus of claim 21, wherein the at least one processor is configured to:
obtain at least one additional input image associated with the face, wherein the additional 3D facial model is generated based on the at least one additional input image associated with the face, wherein:
the at least one input image associated with the face is associated with a first facial expression;
the at least one additional input image associated with the face is associated with a second facial expression; and
the first facial expression and the second facial expression are different.

25. The apparatus of claim 16, wherein the at least one input image associated with the face comprises two or more partial images of the face.

26. The apparatus of claim 25, wherein the at least one input image associated with the face comprises an image of a left eye of the face, an image of a right eye of the face, and an image of a mouth of the face.

27. The apparatus of claim 26, wherein, to generate the one or more features of the face, the at least one processor is configured to:
generate a first facial image feature vector based on the image of the left eye of the face;
generate a second facial image feature vector based on the image of the right eye of the face; and
generate a third facial image feature vector based on the image of the mouth of the face.

28. The apparatus of claim 27, at least one processor is configured to:

combine the first facial image feature vector with the pose feature vector;

combine the second facial image feature vector with the pose feature vector; and combine the third facial image feature vector with the pose feature vector.

29. The apparatus of claim 28, wherein combining the first facial image feature vector, the second facial image feature vector, and the third facial image feature vector with the pose feature vector comprises:

performing an element-wise sum of the first facial image feature vector and the pose feature vector;

performing an element-wise sum of the second facial image feature vector and the pose feature vector; and performing an element-wise sum of the third facial image feature vector and the pose feature vector.

30. The apparatus of claim 16, wherein, to generate the face feature vector, the at least one processor is configured to process the at least one input image through a first neural network layer of the machine learning model, and wherein, to generate the pose feature vector, the at least one processor is configured to process the pose through a second neural network layer of the machine learning model, the second neural network layer being different from the first neural network layer.

* * * * *